(12) United States Patent
Ridgeway et al.

(10) Patent No.: US 12,097,672 B2
(45) Date of Patent: Sep. 24, 2024

(54) SYSTEMS AND METHODS FOR ACTUALIZING SIMULATED SCARFS AND PATCHES FOR REPAIR OF COMPOSITE LAMINATES

(71) Applicant: The Boeing Company, Chicago, IL (US)

(72) Inventors: Larry D. Ridgeway, Snohomish, WA (US); Pradeep Krishnaswamy, Redmond, WA (US); Daniel L. Lichtenstein, Lake Forest Park, WA (US); John V. Van Horn, Bothell, WA (US); Paul J. Shirron, Black Diamond, WA (US)

(73) Assignee: The Boeing Company, Arlington, VA (US)

( * ) Notice: Subject to any disclaimer, the term of this patent is extended or adjusted under 35 U.S.C. 154(b) by 580 days.

(21) Appl. No.: 17/317,542

(22) Filed: May 11, 2021

(65) Prior Publication Data
US 2022/0134691 A1    May 5, 2022

Related U.S. Application Data

(60) Provisional application No. 63/107,557, filed on Oct. 30, 2020.

(51) Int. Cl.
| | |
|---|---|
| *B29C 73/26* | (2006.01) |
| *B29C 73/10* | (2006.01) |
| *G05B 19/4099* | (2006.01) |
| *G06F 30/12* | (2020.01) |

(Continued)

(52) U.S. Cl.
CPC .............. *B29C 73/26* (2013.01); *B29C 73/10* (2013.01); *G05B 19/4099* (2013.01); *G06F 30/12* (2020.01); *G06F 30/20* (2020.01); *B29C 2073/264* (2013.01); *G05B 2219/37441* (2013.01); *G06F 2113/26* (2020.01)

(58) Field of Classification Search
CPC ... B29C 73/26; B29C 73/10; B29C 2073/264; G05B 19/4099; G05B 2219/37441; G06F 30/12; G06F 30/20; G06F 2113/26
See application file for complete search history.

(56) References Cited

U.S. PATENT DOCUMENTS

| | | | |
|---|---|---|---|
| 8,285,407 B2 | 10/2012 | Kessel et al. | |
| 8,321,180 B2 | 11/2012 | Kessel et al. | |
| 8,442,804 B2 | 5/2013 | Kessel et al. | |

(Continued)

*Primary Examiner* — Chad G Erdman
(74) *Attorney, Agent, or Firm* — Ostrager Chong Flaherty & Broitman P.C.

(57) ABSTRACT

Systems and methods for actualizing simulated scarfing and patching for repair of composite laminates. A virtual environment is provided that enables engineers to optimize a repair design and provide the most robust repair solution that meets structural requirements, while minimizing the material removal and the impact to the composite structure. An optimization algorithm is configured to adjust contour offsets for pad-up plies and adjust scarf taper ratios in any direction to reduce the amount of material removed or avoid underlying structures. Scarf repair designs are subsequently transmitted to repair technicians for manual scarfing via printed templates or automated/robotic scarfing using converted computer-readable code. The technology also provides digital data for automated repair ply cutting.

20 Claims, 20 Drawing Sheets

(51) Int. Cl.
*G06F 30/20* (2020.01)
*G06F 113/26* (2020.01)

(56) References Cited

U.S. PATENT DOCUMENTS

| | | |
|---|---|---|
| 8,524,020 B2 | 9/2013 | Lindgren et al. |
| 8,568,545 B2 * | 10/2013 | Lindgren ................ B29C 73/10 |
| | | 156/367 |
| 8,977,528 B2 | 3/2015 | Greenberg et al. |
| 9,676,151 B2 * | 6/2017 | Hadley ................... B29C 73/10 |
| 2015/0367509 A1 * | 12/2015 | Georgeson ............... B64F 5/60 |
| | | 901/44 |
| 2016/0339652 A1 * | 11/2016 | Safai .................... G05B 19/048 |
| 2017/0008184 A1 * | 1/2017 | Tomblin ................. B26D 5/007 |
| 2019/0039338 A1 * | 2/2019 | Linde ................. B23K 26/0006 |
| 2020/0023537 A1 * | 1/2020 | Fetfatsidis ............. B26D 5/007 |

* cited by examiner

SYSTEMS AND METHODS FOR ACTUALIZING SIMULATED SCARFS AND PATCHES FOR REPAIR OF COMPOSITE LAMINATES

RELATED PATENT APPLICATION

This application claims the benefit, under Title 35, United States Code, Section 119(e) of U.S. Provisional Application No. 63/107,557 filed on Oct. 30, 2020.

BACKGROUND

The present disclosure generally relates to techniques for repairing areas of a structure made of composite material (e.g., fiber-reinforced plastic (FRP)), and more particularly relates to automated production and installation of patches used to repair areas of composite structures. As used herein, the term "composite material" means a laminate consisting of a stack of adhesively bonded plies, each ply consisting of parallel fibers embedded in an epoxy resin (hereinafter "epoxy") matrix. The plies in a stack typically have different fiber orientations.

Composite structures sometimes include localized areas that may not conform to product and/or performance specifications for any of a variety of reasons. Localized non-conformities may be reduced or eliminated by reworking the structure. Composite parts and composite structure may also develop discrepancies and require repairs. The rework/repair process may involve removing one or more plies of material from the structure and then replacing the removed material with a composite patch that is adhesively bonded to the structure. As used hereinafter, the term "repair" means repair or rework.

Scarfing is a subtractive process involving removal of material by mechanical means, for example, by grinding or machining. For the FRP repair process, it is typical to apply a hand layup of plies to form a repair patch on a scarfed section of a structure to be repaired. This typical method of fabricating a composite patch is time consuming and labor intensive.

Current scarf repair methods are performed in accordance with a set of rules (hereinafter "policy") provided in a repair document. The rules assume that the repair technician can visually identify the ply boundaries and fiber orientations. However, these features may be difficult or impossible to visually identify in a repair site where the ply boundaries visually blend together or when manufacturing variables produced anomalous artifacts such as ply overlaps, crenulations, gaps, etc.

Currently plies are cut manually using templates that are hand drawn. Manual ply cutting leads to errors that may result in omitted plies, or under-trimmed plies that can reduce the structural strength of the patch, or conversely, mismatched fiber orientations or excessively large plies that can overly stiffen the repair area and lead to higher strain in the surrounding laminate.

Therefore, it would be advantageous to provide a system and a method for repairing composite structures that takes into account one or more of the issues discussed above and possibly other issues.

SUMMARY

The subject matter disclosed herein is directed to systems and methods for actualizing simulated scarfing and patching for repair of composite laminates (e.g., made of fiber-reinforced plastic material). Scarf and bond repair of a composite laminate is designed according to the underlying ply geometry and fiber orientation for each ply at the location of a discrepancy on the surface of a structure (e.g., a fuselage or wing of an aircraft). The technology proposed herein provides a virtual environment that enables a computer system user to optimize a repair design and provide a robust repair solution that meets structural requirements (e.g., engineering specifications), while minimizing material removal and impact to the composite structure.

In accordance with one embodiment, an algorithm is configured to adjust scarf taper ratios (hereinafter "taper ratios") in any direction to reduce the amount of material removed when pad-up plies are present or to avoid underlying structures. Scarf repair designs are subsequently transmitted to repair technicians for manual scarfing via printed templates or automated robotic scarfing using computer-readable code. More specifically, the technology proposed herein provides the necessary geometric details to allow machining code to be created to support semi-automated and automated scarfing processes. Furthermore, the technology proposed herein provides digital data for automated repair ply cutting.

Although various embodiments of systems and methods for actualizing simulated scarfing and patching for repair of composite laminates will be described in some detail below, one or more of those embodiments may be characterized by one or more of the following aspects.

One aspect of the subject matter disclosed in detail below is a method for repairing a composite structure, the method comprising: (a) acquiring discrepancy data that defines a location and size of a discrepancy on a surface of a composite laminate; (b) analyzing the acquired data to determine an optimal scarf shape and repair methodology; (c) retrieving model data for the composite laminate from data storage; (d) creating a discrepancy sketch of the discrepancy based at least in part on the discrepancy data and the model data; (e) generating a scarfed laminate model having a virtual scarfed surface in accordance with a policy defining how to create the virtual scarfed surface based on the discrepancy sketch; and (f) generating machine code for programming a machine to scarf the surface of the composite laminate in an area of the discrepancy to create a scarfed surface in conformance with the virtual scarfed surface.

In accordance with one proposed implementation, the method described in the immediately preceding paragraph further comprises: (g) programming the machine with the machine code; (h) placing the machine at a scarf start position relative to the composite laminate; and (i) activating the machine to scarf the surface of the composite laminate in the area of the discrepancy by executing the machine code. (j) generating a virtual patch that matches the virtual scarfed surface in accordance with an optimization algorithm and the policy, the virtual patch comprising virtual repair plies with ply overlaps and virtual structural plies; (k) creating flattened ply contours of the virtual repair plies and virtual structural plies on a planar surface to support automated ply cutting; (l) exporting digital files specifying the flattened ply contours for use by a ply cutting machine; (m) loading the digital files specifying the flattened ply contours into the ply cutting machine; (n) placing a ply on the ply cutting machine; (o) activating the ply cutting machine to cut the ply to form a repair ply having a flattened ply contour as specified in one of the digital files specifying the flattened ply contours (wherein steps (n) and (o) are repeated for each virtual ply to form respective repair plies having flattened ply contours as specified in the digital files); (p) stacking the repair plies to form a repair patch; and (q) bonding the repair patch to the scarfed surface.

Another aspect of the subject matter disclosed in detail below is a method for repairing a composite structure, the method comprising: acquiring discrepancy data that defines a location and size of a discrepancy on a surface of a composite laminate; analyzing the acquired data to determine an optimal scarf shape and repair methodology; retrieving model data for the composite laminate from data storage; creating a discrepancy sketch of the discrepancy based at least in part on the discrepancy data and the model data; generating a scarfed laminate model having a virtual scarfed surface in accordance with a policy defining how to create the virtual scarfed surface based on the discrepancy sketch; generating a virtual patch that matches the virtual scarfed surface in accordance with an optimization algorithm and the policy, the virtual patch comprising virtual repair plies with ply overlaps and virtual structural plies; creating flattened ply contours of the virtual repair plies and virtual structural plies on a planar surface to support automated ply cutting; and exporting digital files specifying the flattened ply contours for use by a ply cutting machine. In accordance with one embodiment, the method further comprises: loading the digital files specifying the flattened ply contours into the ply cutting machine; placing a ply on the ply cutting machine; and activating the ply cutting machine to cut the ply to form a repair ply having a flattened ply contour as specified in one of the digital files specifying the flattened ply contours.

A further aspect of the subject matter disclosed in detail below is method for repairing a composite structure, the method comprising: (a) acquiring discrepancy data that defines a location and size of a discrepancy on a surface of a composite laminate; (b) analyzing the acquired data to determine an optimal scarf shape and repair methodology; (c) retrieving model data for the composite laminate from data storage; (d) creating a discrepancy sketch of the discrepancy based at least in part on the discrepancy data and the model data; (e) generating a scarfed laminate model having a virtual scarfed surface in accordance with a policy defining how to create the virtual scarfed surface based on the discrepancy sketch; (f) generating a topographic profile based on the scarfed laminate model; and (g) exporting a digital file specifying a plurality of topographic contours of the topographic profile. In accordance with one embodiment, the method further comprises: (h) loading the digital file specifying the plurality of topographic contours into a smart router; (i) placing the smart router on the surface of the composite laminate; and (j) activating the smart router to form a stepped scarf in the composite laminate having contours in conformance with respective specified topographic contours.

Yet another aspect of the subject matter disclosed in detail below is a system comprising: a computer; a memory in communication with the computer; and an application stored in the memory and executable by the computer, wherein the application comprises: a user interface; a simulation software module configured to perform functions including discrepancy damage definition and scarf repair creation; a first post-simulation software module that enables the computer to generate code for controlling robotic machining of a scarf; a second post-simulation software module that enables the computer to generate files containing digital data representing patch ply geometry in a format acceptable to a ply cutter; and a third post-simulation software module that enables the computer to generate files containing digital data representing topographic contours. The generated code and files are dependent on results of the discrepancy damage definition and scarf repair creation.

Other aspects of systems and methods for actualizing simulated scarfing and patching for repair of composite laminates are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
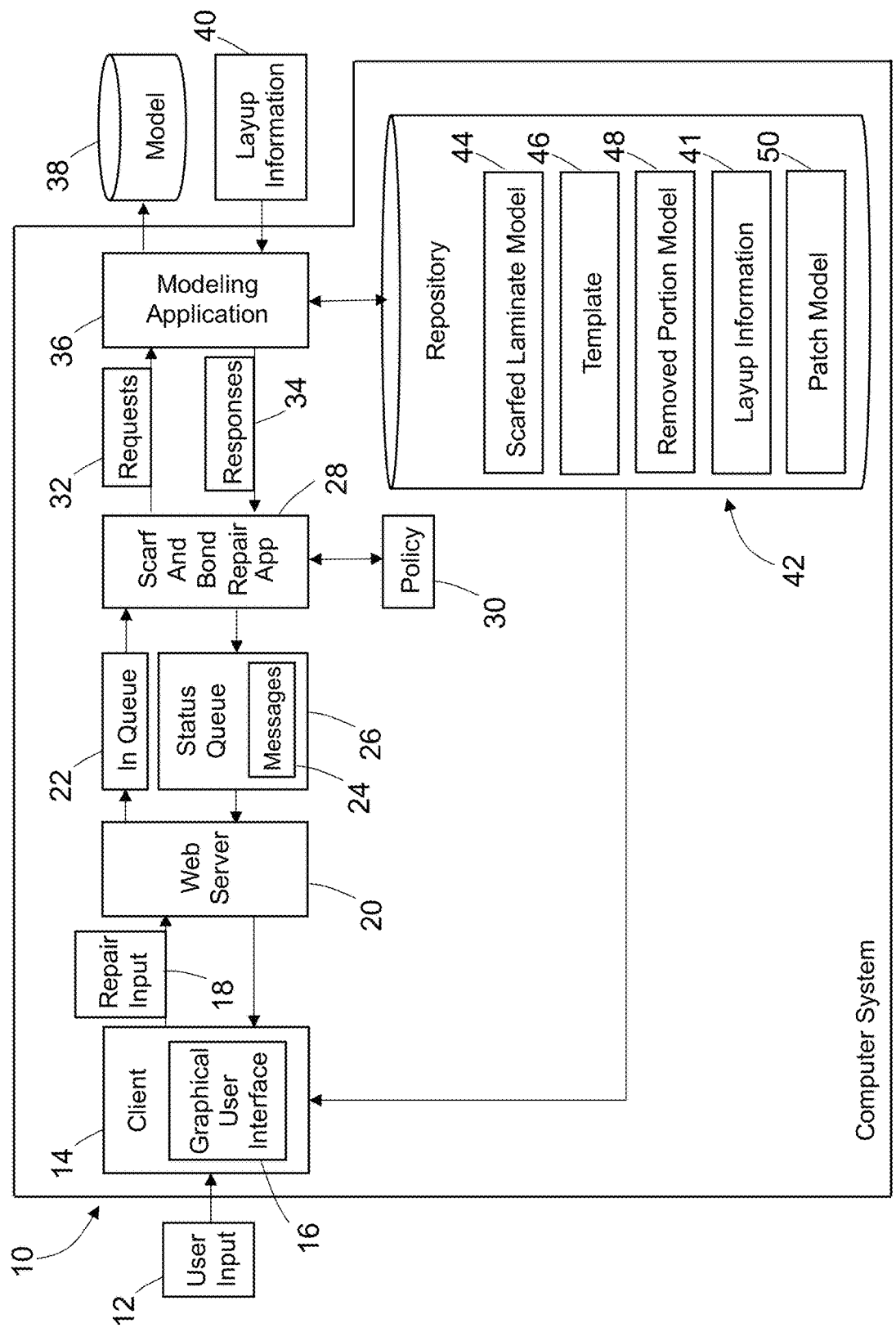
FIG. 1 is a block diagram identifying components of a computer system programmed with the capabilities to simulate a composite repair and generate scarf and patch models in accordance with an illustrative embodiment.

For the purpose of illustration, systems and methods for actualizing simulated scarfing and patching for repair of composite laminates will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which can vary from one implementation to another. Moreover, it will be appreciated that such a development effort might be complex and time-consuming, but would nevertheless be a routine undertaking for those of ordinary skill in the art having the benefit of this disclosure.

The embodiments disclosed below relate to methods of repairing or reworking an area of a composite structure in order to reduce or eliminate discrepancies in the structure and/or to change physical characteristics of localized areas of the structure. For ease of the following description, the terms "repair" and "repairing" are intended to include repairs made to and rework done on a discrepant regions of a composite structure.

For the purpose of illustration, various embodiments of a system for repairing composite structures will be described in the context of aircraft manufacturing and service. However, it should be appreciated that the technology disclosed herein is equally applicable to repairing composite structure other than fuselages, wings, and stabilizers of an aircraft.

A repair method and system uses scarfing, ply lay-up, vacuum debulking, and adhesive bonding to repair a composite laminate following detection of a discrepancy. The discrepancy in the composite material has a shape. Various non-destructive inspection techniques may be used to acquire data representing the size, shape, and depth of the discrepancy. The acquired data representing the size, shape, and depth of the discrepancy may be converted into a three-dimensional (3-D) model of the discrepant section of a structure. An outline of the 3-D model may be projected onto a plane and displayed in the form of a so-called "discrepancy sketch". In other words, a discrepancy sketch is a plan view of the discrepant section prior to scarfing.

To remove a discrepancy, respective portions of each ply of composite material are removed by scarfing (e.g., sanding) to form a depression (referred to herein as a "scarf") having a shape and a perimeter. The respective removed portions of plies are referred to hereinafter as "removed portions of composite material". The removed portions of composite material include the discrepancy. The sanding is done either manually or mechanically using various grits of sandpaper, and diamond or carbide grit cutting wheels. The repair technician sands in a circular, oblong, oval, or semi-circular pattern based on the defect configuration and location. The shape of the scarf is dependent on the shape of the discrepancy in the section to be repaired. For example, if the discrepancy is in the form of a depression, then the scarf is a depression having a volume greater than the volume of the discrepancy.

In accordance with one set of specifications, the composite material having the discrepancy may be scarfed at a nominal slope of a 30 to 1 ratio (the ratio of the taper length to depth) with an allowable range between 28 to 1 and 32 to 1. The scarf may have a tapered cross section such that bands of different plies are visible when the area is viewed from a plan view. The tapered surface of the scarf forms a depression which is designed to receive a repair patch that mimics the composite structure at the repair site.

After the physical (not virtual) scarfing procedure has been completed, a patch is placed in and bonded to the scarf. The patch has a shape that substantially corresponds to (matches) the shape of the scarf. The dimensions of the patch are only slightly greater than the dimensions of the scarf to ensure that repair plies overlap the scarfed plies respectively to transfer applied loads.

To design an appropriate patch taking into account variations and features in the repaired structure and variations in the thicknesses of the composite material may require additional research and time on the part of the repair technician. For example, an identification of the plies and their respective fiber orientations may be found in a computer aided design (CAD) model of the aircraft. The composition, orientation, and other information about the plies may be found in yet a different database or repository. This information may be located in a repository for computer numerical control (CNC) machines that lay down tows of composite material. Information for a layup for the composite material may be identified based on the shape and the location of the scarf. A virtual patch simulation process can be used to generate a patch model based on the retrieved composite laminate structural data. A repair patch may be fabricated based on the results of the patch model. Then the patch and scarfed section are bonded together to repair the laminated structure.

The patch may be made of the same composite material that is being repaired (i.e., the same fibers, same epoxy resin, and same distribution of fibers in the epoxy matrix). More specifically, the thicknesses and fiber orientations of the plies of the patch may match the thicknesses and fiber orientations of the plies of the composite material. The fiber orientations in the portions of the plies removed to form the scarf may have different orientations. Each ply may have an orientation that is selected to achieve a particular property or properties. For example, the orientations may be selected to provide properties such as a desired strength, durability, and other suitable features. Preferably, the plies installed have the same orientation, thickness, and materials as the plies removed.

A repair technician may determine the location of a discrepancy by coordinates, measurements, and/or other information. A computer system user (hereinafter "user") may input the discrepant location into a computer system that is configured (e.g., programmed) to generate virtual scarfs and virtual patches for use in a simulation of a repair or repair scenario. In particular, the computer system includes a module that uses the location and shape of the discrepancy to identify information characterizing the layup of the composite material. Additionally, information about neighboring structures may be used to design, select, and/or manufacture a patch.

As used herein, the term "computer system" should be construed broadly to encompass a system consisting of a single computer or multiple computers which communicate via a network or bus. As used herein, the term "computer" refers to a device that comprises one or more data processing units (e.g., processors) and data storing memory (a.k.a. non-transitory tangible computer-readable storage medium) which is accessible by the data processing units.

In accordance with one embodiment, the computer system is configured to create a 3-D model of a portion of a scarfed laminate (hereinafter "scarfed laminate model"). The scarfed laminate model is generated based in part on the size and shape of the discrepancy and in accordance with a repair policy. The computer system is also configured to project an image of the 3-D model of the scarfed laminate onto a plane to form a template. The template is a two-dimensional (2-D) plan view of the scarfed section and typically includes contour lines representing the inner perimeters of respective plies surrounding a scarf template center point. The center point is a point that is placed on the scarfed laminate model at or near the center of the discrepancy. The scarfed laminate model and the template may be presented on a display device by means of a visualization application.

FIG. 1 is a block diagram identifying components of a computer system 10 programmed with the capabilities to simulate a composite repair and generate a scarfed laminate model 44 and a patch model 50 in accordance with an illustrative embodiment. The computer system 10 includes client 14, web server 20, scarf and bond repair application 28, modeling application 36, and repository 42. All of these software components may run on one or more computers within computer system 10. Client 14 receives user input 12 using a graphical user interface 16. Client 14 may be a browser application or some other suitable application. User input 12 is entered by the user via graphical user interface 16. In alternative embodiments, user input 12 may be sent to client 14 by an application, computer, or other device rather than via graphical user interface 16. Client 14 may be connected to the Internet or a local area network. Graphical user interface 16 receives user input 12 and displays information to a user.

User input 12 includes information used to define the scarf and patch to be created, such as the location and shape of the discrepancy. More specifically, the user input information is used to generate the scarfed laminate model 44 and the patch model 50, which are stored in repository 42. Scarfed laminate model 44 is a virtual representation of a physical scarf to be "actualized" (constructed by removing material) for use in the repair. Patch model 50 is a virtual representation of a physical patch to be "actualized" (fabricated by adding material) for use in the repair. Additionally, user input 12 may include an identification of the aircraft being serviced and other suitable information. This user input may take the form of text, values, images, and other types of input.

User input 12 may be formatted, processed, validated, and/or otherwise processed by client 14 to form repair input 18. Client 14 sends repair input 18 to web server 20. Web server 20 is a process in computer system 10 that receives repair input 18 from clients, such as client 14. Additionally, web server 20 may receive repair input 18 from other clients. Repair input 18 is placed into an "in" queue 22 by means of web server 20. Additionally, web server 20 may monitor a status queue 26 for messages 24. Any of messages 24 in status queue 26 may then be sent to client 14 for display on graphical user interface 16.

Still referring to FIG. 1, the scarf and bond repair application 28 monitors "in" queue 22 for repair input 18. The repair input 18 is processed by scarf and bond repair application 28 to generate a template 46, which may be stored in a repository 42. In a typical repair operation, the scarf and bond repair application 28 sends requests 32 to modeling application 36 to access a model 38 of the aircraft. Modeling application 36 may be a CAD application. For example, the modeling application 36 may be CATIA, which stands for "computer-aided three-dimensional interactive application. CATIA is a multi-platform software suite for computer-aided design (CAD), computer-aided manufacturing (CAM), computer-aided engineering (CAE), product life cycle management (PLM), and 3-D visualization, developed by Dassault Systemes.

Scarf and bond repair application 28 sends requests 32 to modeling application 36 to load model 38. After model 38 has been loaded, scarf and bond repair application 28 sends requests 32 to modeling application 36 to retrieve layup information from a layup information database 40. Layup information may be returned to scarf and bond repair application 28 in responses 34 and stored in repository 42. Layup information is information about the layup of plies in the composite material. Additionally, scarf and bond repair application 28 sends requests 32 to modeling application 36 to virtually remove portions of plies to generate the scarfed laminate model 44. In addition, modeling application 36 constructs a removed portion model 48. Removed portions are located and plies are identified based on the shape and location of the discrepancy and in accordance with the rules of policy 30. Additionally, the removed portions may be located to avoid features or components incorporated in the composite structure.

After construction of template 46 has been completed, scarf and bond repair application 28 stores template 46 in repository 42 for access by client 14. Repository 42 is non-transitory tangible computer-readable storage medium configured to store a repair database. The scarf and bond repair application 28 then places a message 24 into status queue 26 to indicate that the template 46 has been completed. Web server 20 monitors status queue 26. When messages 24 are detected in status queue 26, web server 20 sends messages 24 to client 14. Messages 24 indicate that template 46 is ready. Messages 24 may include, for example, a universal resource locator that points to a location of template 46. The user may then retrieve template 46 for display on graphical user interface 16. This retrieval may be directly from repository 42.

In accordance with one proposed implementation, computer system 10 is configured to identify the shape of the scarfed section, including the perimeter, based on the shape of the discrepancy and in accordance with policy 30. The computer system 10 may also select other parameters, such as scarf depth. The scarf perimeter may have an irregular shape. A respective perimeter may be defined for each ply that has a portion removed to form the scarf. As a result, computer system 10 may define different shapes of respective perimeters for respective areas of plies to be removed.

With this selection, the taper ratio or taper angle of the plies may vary around a scarf perimeter. In this manner, a more effective form of patch may be created. For example, if too much material is removed from plies of composite material, the component may have to be replaced instead of repaired.

With an irregular shape, the amount of composite material removed may be reduced to allow for repair instead of replacement of the affected component. In this manner, removed portions of plies may be made smaller as compared to using some regular shapes, such as a circle or a track. Also, with an irregular shape, an embedded feature or component in proximity to the discrepancy may be taken into account. For example, with a shape, such as a circle, structures may be more difficult to take into account if the circle encompasses one or more of structures. With an irregular shape, the scarf perimeter may be designed to exclude a proximate structure. Further, computer system 10 may also identify where plies begin and end within plies of the composite material. For example, a ply may be on the same level as another ply.

Policy 30 comprises a number of rules and may also include data used to apply the number of rules. Policy 30 defines how the scarf is to be created. Policy 30 may also define how the patch is to be designed, selected, and/or manufactured. For example, policy 30 may provide rules dictating how many plies should have material removed and the size of the removed portions, which size is a function of (e.g., greater than) the size of the discrepancy.

Additionally, policy 30 may include rules that select parameters, such as taper ratio, variable taper ratios, and other suitable types of rules. For example, a taper ratio of 30:1 is typically used for composite repair. This taper ratio, however, may be impracticable for some areas. As a result, the taper ratio may change from 30:1 in part of the scarf to 20:1 in another part of the scarf. This change or variation in the taper ratio is referred to as a "variable taper ratio". The change in the taper ratio may allow removing fewer plies when forming the scarf. As a result, the size of scarf may be minimized.

Still referring to FIG. 1, the template 46 is used by the repair technician to perform operations for repairing the discrepant location. For example, template 46 provides information specifying removed portions of the plies of composite material. Further, template 46 also may provide information for how to form the patch and/or place the patch into the scarf to perform the repair at the discrepant location. In this manner, the repair technician may perform a repair in a manner that reduces time and expense for maintenance operations on an aircraft.

Figure 2:
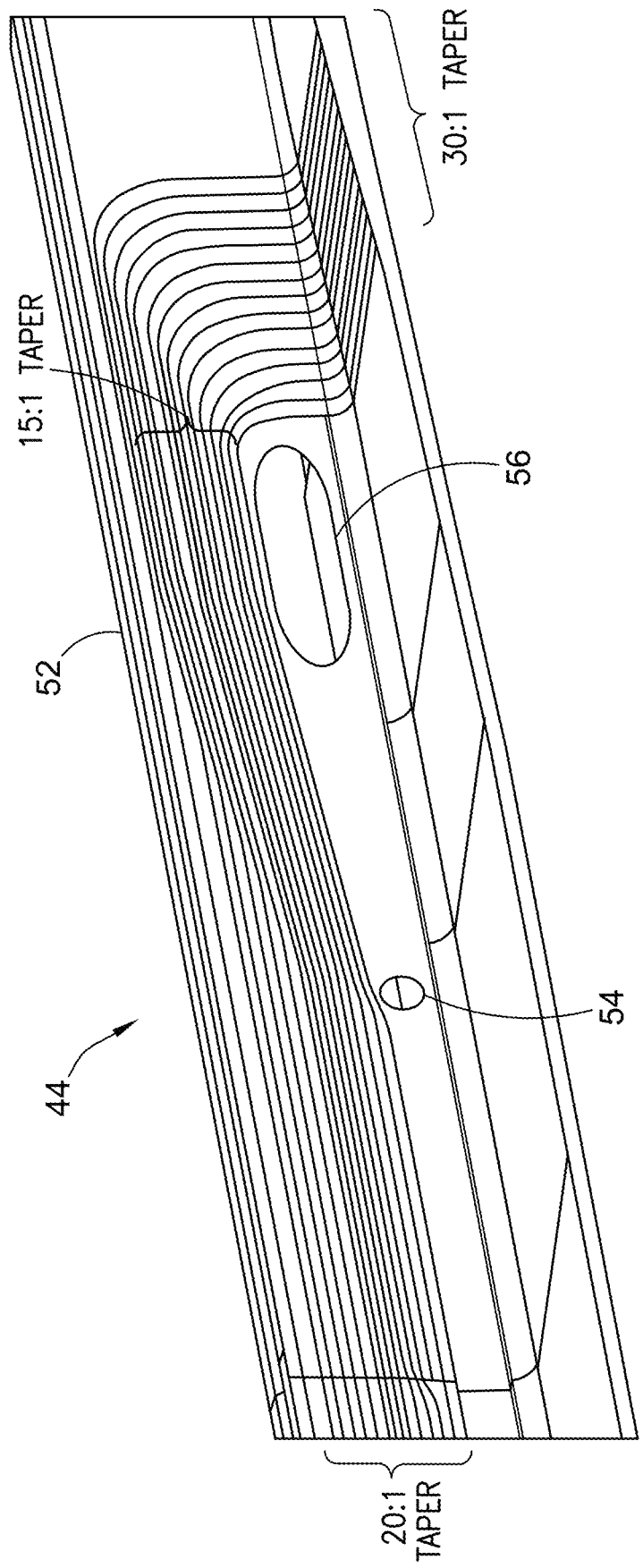
FIG. 2 is a diagram representing an example scarfed laminate model of a beam-shaped part with a circular penetration and an elongated racetrack-shaped penetration.

FIG. 2 is a diagram representing an example scarfed laminate model 44 of a beam-shaped part 52 with a circular penetration 54 and an elongated racetrack-shaped penetration 56. The scarf and bond repair application 28 may be activated to execute a "minimized material removal" algorithm which is designed to produce an optimal scarf that avoids the penetrations depicted in FIG. 2. The scarf taper is varied to optimize (minimize) the material removed. In the alternative, the scarf and bond repair application 28 may be activated to execute a "smoothed offset" algorithm which adjusts contour offsets for pad-up plies and allows individual inputs for variable taper ratios in multiple directions. The directions are defined in the sketch interface for each poly line, radius, or straight line segment in the sketch. The sketch interface is the CAD environment where the sketch is created. The sketch defines the shape of the scarf for the bottom ply being scarfed (e.g., the basic circle or racetrack shape).

Figure 3:
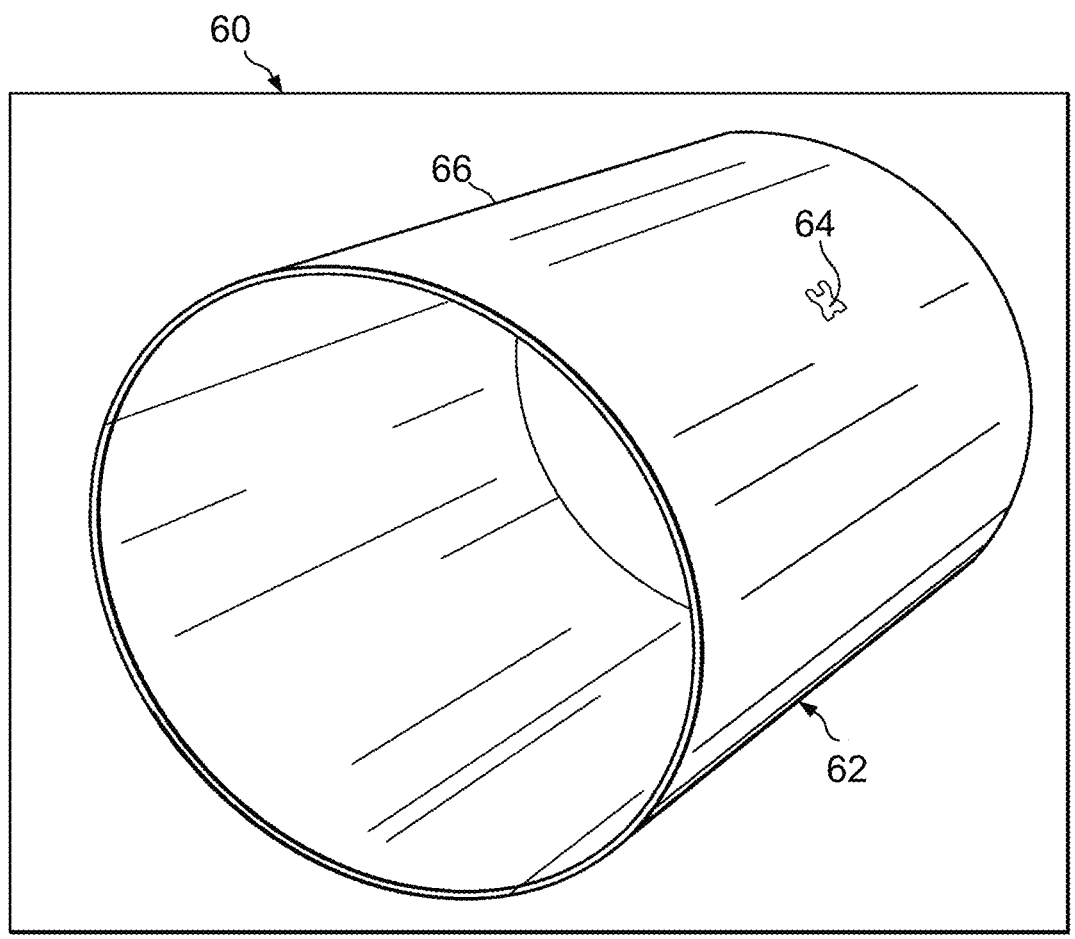
FIG. 3 is a diagram representing a display window presenting a perspective view of a three-dimensional (3-D) model of a fuselage skin having a discrepancy on the surface.

FIG. 3 is a diagram representing a display window 60 presenting a perspective view of a 3-D model 62 of a fuselage skin having a simulated discrepancy 64 on surface 66. In this example, the display window 60 may be presented on graphical user interface 16 for client 14 identified in FIG. 1. The 3-D model 62 of a fuselage skin may be manipulated by a user. For example, a user may rotate the 3-D model 62 of the fuselage skin or crop the 3-D model 62 and magnify only the portion of fuselage skin in the area of the simulated discrepancy 64.

Figure 4:
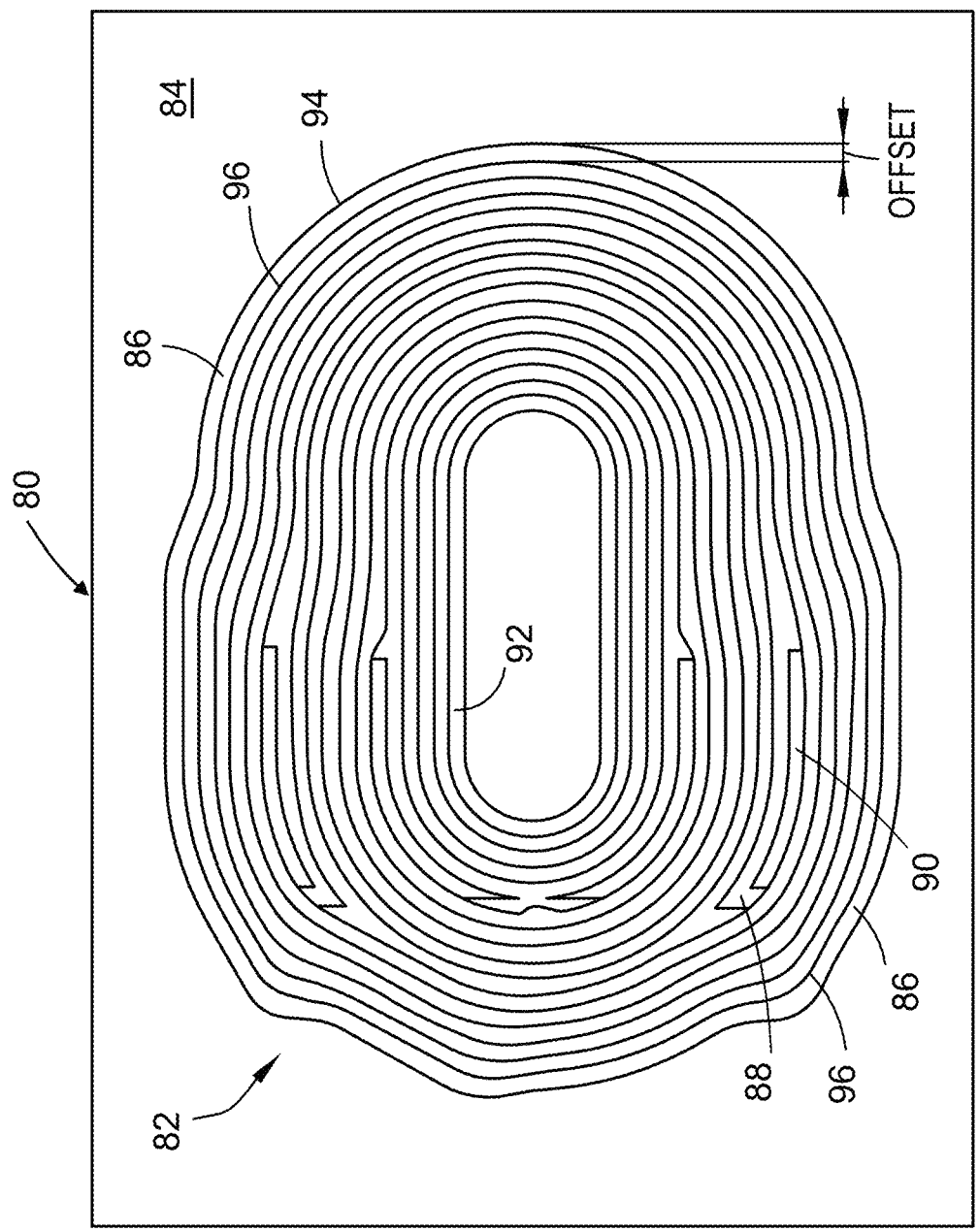
FIG. 4 is a diagram representing a display window presenting a two-dimensional (2-D) plan view (also referred to herein as a "scarf template") of a scarf formed on a fuselage skin, including an indication of a scarfed ply offset.

FIG. 4 is a diagram representing a display window 80 presenting a 2-D plan view (also referred to herein as a "scarf template") of a scarf formed on a fuselage skin, including an indication of a scarfed ply offset. The display window 80 may be presented on graphical user interface 16 for viewing by a client 14 (see FIG. 1). In this example, the fuselage skin consists of a multiplicity of stacked plies made of composite material, which plies have been scarfed to create a tapered surface having variable scarf taper ratios defined by the user. The depth of each scarfed ply increases from the top ply 84 to the bottom ply 92.

A scarf taper ratio is the ratio of the scarf taper width to the scarf depth in a cross-sectional plane that intersects the scarf template center point. The offset for each ply is computed by multiplying the ply thickness T times the scarf taper ratio. For example, if each ply in the scarfed laminate is 0.008" (0.2032 millimeters (mm)) thick and a 30:1 taper ratio is defined, then the offset for each ply is computed as: 0.008"×30=0.24" (6.096 mm). The scarf and bond repair application uses the offset in creating the contours for each ply that is scarfed. The scarf and bond repair application extracts the thickness for each ply individually in the stackup and then multiplies the thickness by the taper ratio to build contours representing the inner perimeters of individual scarfed plies.

In the example depicted in FIG. 4, the scarf template 82 includes a pair of pad-up plies 88 and 90 having respective portions separated by a gap where material is removed during scarfing. The inner perimeter of each scarfed ply is indicated by a respective contour line. For example, the inner perimeter of the top ply 84 is indicated by contour line 94; the inner perimeter of the next lower ply 86 is indicated by contour line 96. The inner perimeter of each scarfed ply is separated from the inner perimeter of the next lower ply by a respective separation distance called the "offset" dimension. For example, the offset of contour line 96 from contour line 94 is indicated in FIG. 4.

The respective offsets of successive plies may be equal along a radius or along an orthogonal line that intersects the contour lines (radius if the contour lines are semicircular; orthogonal if the contour lines are parallel). In a typical automated scarf modeling system, the scarf taper ratio along one line (e.g., the X axis) may be different from the scarf taper ratio along another line (e.g., the Y axis). The technology proposed herein (and described in some detail below) improves upon this adjustability by allowing the scarf taper ratio to be selected in any direction, not only in the X or Y directions.

Figure 5:
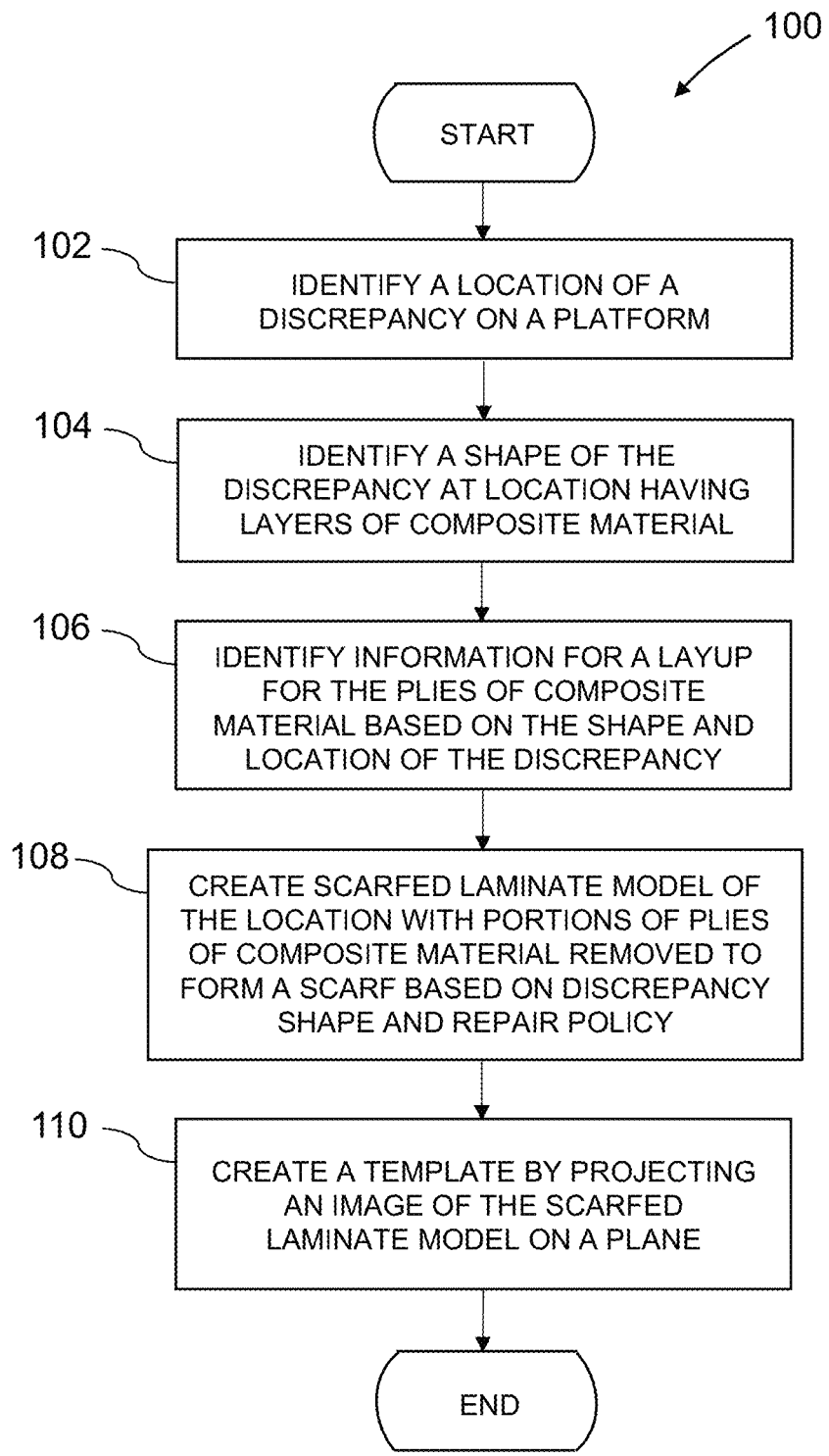
FIG. 5 is a flowchart identifying steps of a method for processing a discrepancy in accordance with an illustrative embodiment.

FIG. 5 is a flowchart identifying steps of a method 100 for processing a discrepancy in accordance with an illustrative embodiment. The method 100 may be implemented using computer system 10 and, in particular, the data processing operations may be performed by computer system 10 shown in FIG. 1.

The method 100 begins by identifying a location of a discrepancy in a composite structural part of a platform (step 102). The identification in step 102 may be made by receiving user input 12 in graphical user interface 16 (see FIG. 1). The method 100 then determines a shape of the discrepancy in the location (step 104). Or the shape may be input to the system by a user (e.g., user input 12 into graphical user interface 16 identified in FIG. 1).

The method 100 then identifies information for a layup for the plies of composite material based on the shape and location of the discrepancy (step 106). In step 106, this information may be obtained from a CAD model of the platform, a database of layup information used to manufacture the platform, and/or other suitable types of information. This information may be in different locations. Computer system 10 may send requests to receive or access this information.

The method 100 then creates a scarfed laminate model 44 of the location with portions of the plies of composite material removed to form a scarf based on the shape of the discrepancy and the repair policy 30 (step 108).

The method 100 then projects an image of the scarfed laminate model onto a plane to create a template that includes contour lines (step 110). The template created in step 110 may be displayed to a user, such as in the display window 80 shown in FIG. 4. The method 100 terminates thereafter.

Figure 6:
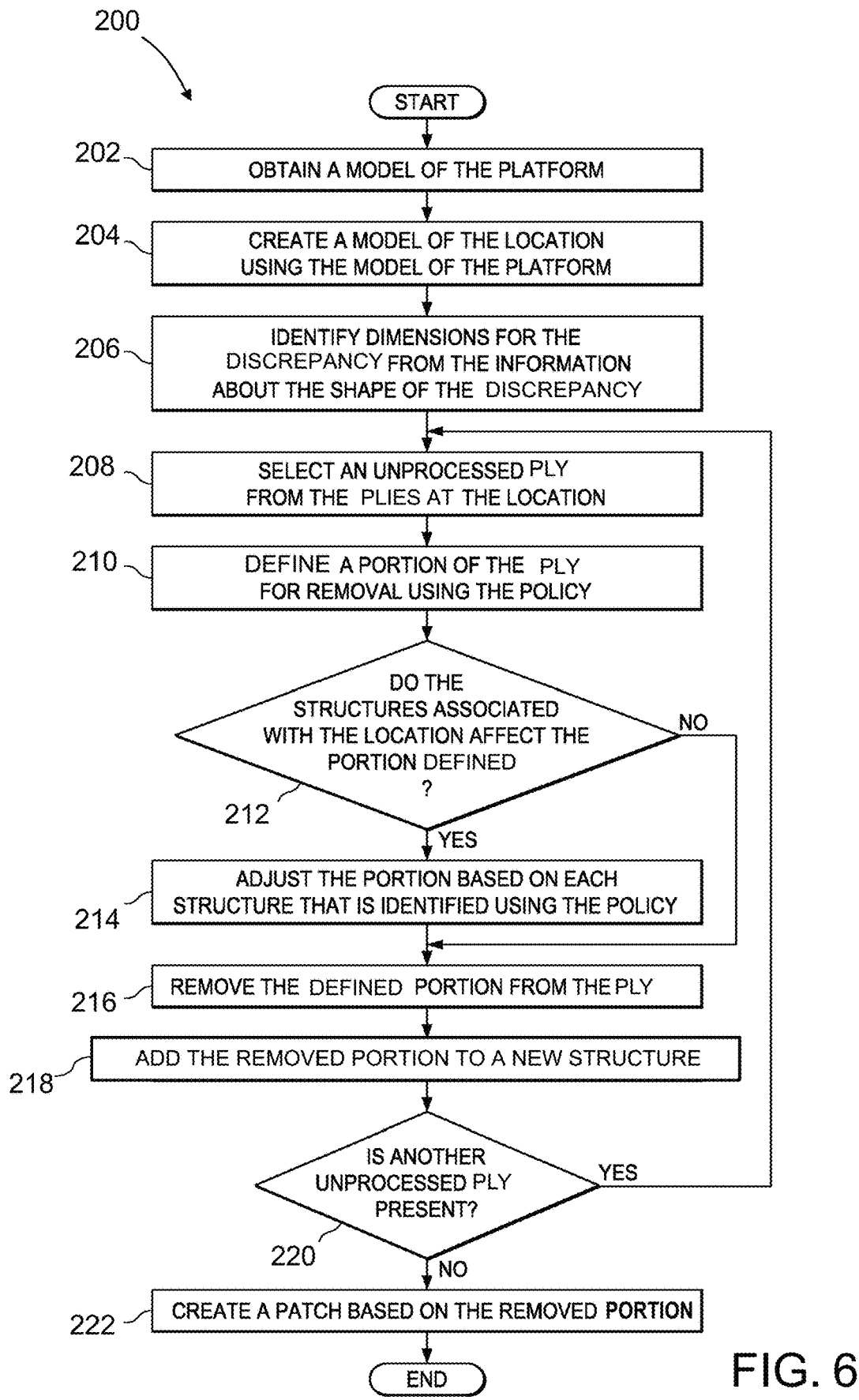
FIG. 6 is a flowchart identifying steps of a method for creating a model of a location with scarfing to remove a discrepancy in accordance with an illustrative embodiment.

FIG. 6 is a flowchart identifying steps of a method 200 for creating a patch model (such as patch model 50 identified in FIG. 1) based on the removed portions of selected plies in accordance with one illustrative embodiment. The method 200 begins by obtaining a model of a platform (e.g., an aircraft) (step 202).

The method then creates a model of a section of the platform by cropping the 3-D model of the platform (step 204). More specifically, a 3-D volume is defined using a "bounding box" that intersects the 3-D model of the platform (as is described in more detail below with reference to FIGS. 7 and 8). The bounding box is placed so that the discrepancy is located within the boundaries of the box. The scarf and bond repair application computes the limits of the bounding box by identifying the number of plies within the region, applying the offset for each ply to the dimensions of the discrepancy in the X and Y directions, and adding the offset to the user-defined additional area desired by the policy.

The method 200 then receives the dimensions of the discrepancy based on information about the shape of the discrepancy (step 206). The dimensions may be extracted from user input providing the information about the shape of the discrepancy. This information may take the form of the dimensions being entered by the user, pictures, drawings, or other suitable information. For example, an image of the discrepancy may be processed to detect edges and then the dimensions of the discrepancy may be calculated based on distances separating points on the edges.

The method 200 then selects an unprocessed ply from the stack of plies at the location (step 208). The method then defines a portion of the selected ply for removal using the policy (step 210). This policy includes rules to identify the area that the portion encompasses, as well as the shape or configuration of the perimeter that defines the area. In some cases, no portion of the selected ply is removed. For example, if the composite material at the location of the discrepancy has N plies, the policy may only require removing portions of some of those plies rather than all of the plies forming the section.

Thereafter, a determination is made as to whether structures associated with the location affect the defined portion to be removed or not (step 212). If a determination is made in step 212 that one or more structures present at the location affect the removal of a portion of a ply, the method 200 adjusts the definition of the portion based on each structure that is identified using the policy (step 214). The policy may provide rules on adjustments to the definition of the portion to be removed based on the location and shape of the structures and other suitable information. If a determination is made in step 212 that the structures do not affect the removal of a portion of a ply, then method 200 proceeds to step 216 directly.

In step 216, the method 200 simulates the removal of the defined portion from the ply. The method 200 then adds the removed portion of each ply to a new structure (step 218). This new structure in the model represents a structure comprised of the portions of the plies that have been removed to form the scarfed section. A determination is then made as to whether another unprocessed ply is present or not (step 220). If a determination is made in step 220 that another unprocessed ply is present, method 200 returns to step 208 to select another unprocessed ply.

If a determination is made in step 220 that another unprocessed ply is not present, method 200 creates a virtual patch based on the removed portions of the plies of composite material (step 222). In step 222, this virtual patch may be created using a standard or pre-defined model. In some cases, step 222 may involve creating a patch based on the new structure formed in step 218. The creation of a patch in step 222 may be the same as the new structure or may have different types of plies with the same general shape, depending on the particular implementation. The method 200 terminates thereafter.

Figure 7:
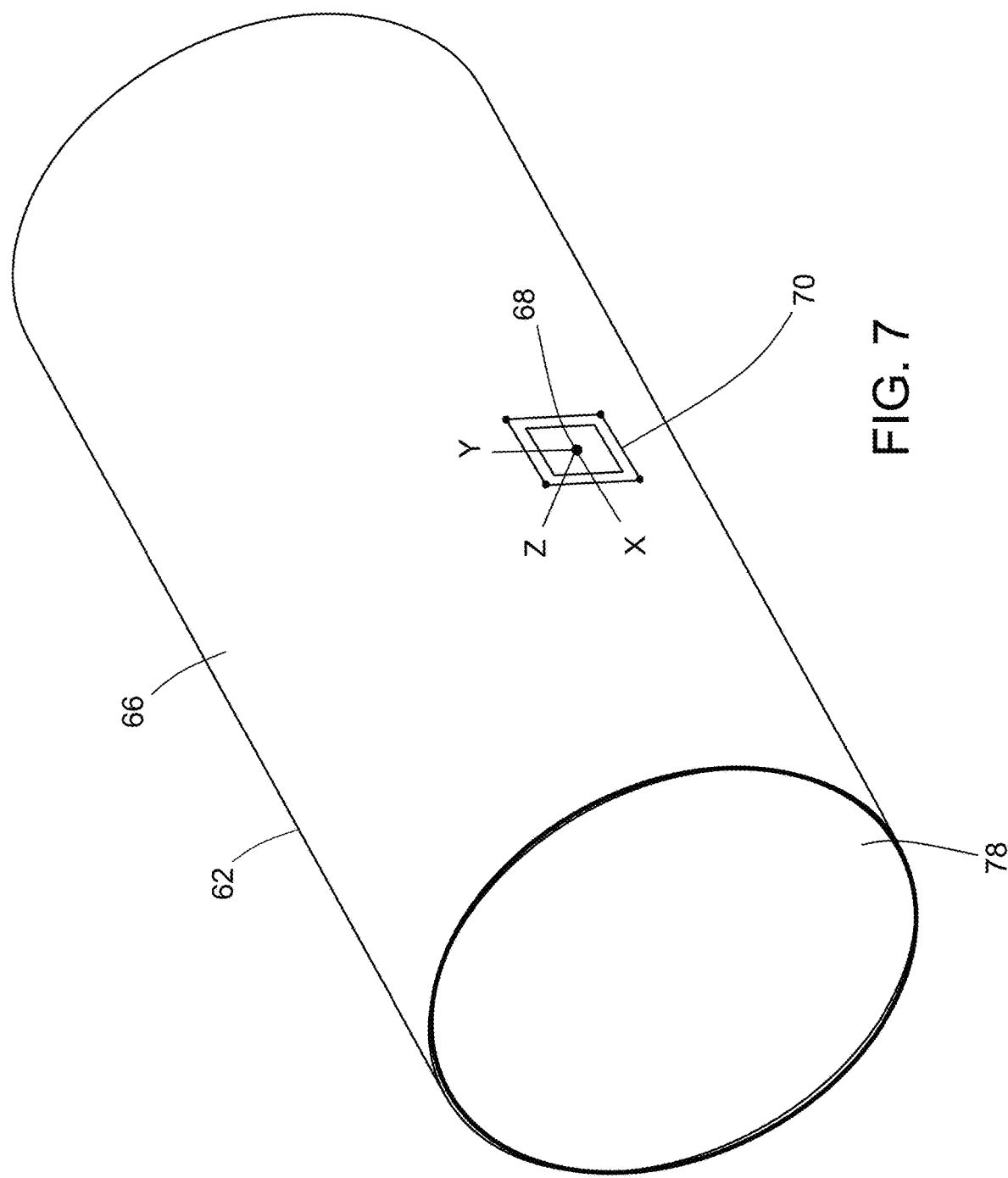
FIG. 7 is a 3-D image illustrating the placement of a 3-D coordinate system on a 3-D model of a cylindrical laminated part, with the origin of the coordinate system located at a scarf template center point and the Z-axis defined as normal to the definition (a.k.a. tooled) surface.

FIG. 7 is a 3-D image illustrating the placement of a 3-D coordinate system on a 3-D model 62 of a fuselage skin having a cylindrical surface 66. The 3-D model 62 includes a cylindrical laminated part that was fabricated by laying plies on the external surface of a cylindrical tool (not shown). The "tool" could also be called a "mold" or "layup mandrel". The external surface of the tool defines the inner mold line (hereinafter "tooling surface 78") of the laminated part contour. In the modeling application (e.g., CAD), the tooling surface 78 is called the "definition surface". The definition surface is the surface that all of the ply geometry is located on in the 3-D model 62.

Still referring to FIG. 7, the origin of the coordinate system is located at a scarf template center point 68 on the tooling surface 78 and the Z-axis is defined as the axis normal to and intersecting the tooling surface 78 at the scarf template center point 68. Once the center point of the discrepant area has been established, the data representing portions of the 3-D model 62 outside the discrepant area may be discarded to improve the efficiency of the scarf and bond repair application. In accordance with one embodiment, the data is pared down (reduced) by cutting out a small region of the laminated part in the area of interest using a rectangle and generating a new laminated part that is referred to herein as the "new sub-laminate".

Figure 8:
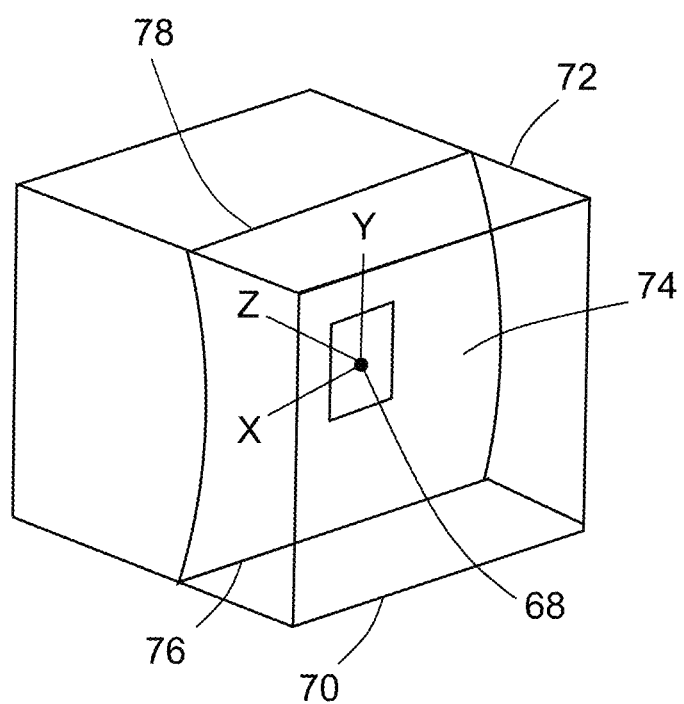
FIG. 8 is a 3-D image illustrating the use of a bounding box to generate an edge-of-part contour line for a new sub-laminate taken from the 3-D model of the full laminated part depicted in FIG. 7.

FIG. 8 is a 3-D image illustrating the use of a bounding box 72 to generate an edge-of-part contour line 76 for a new sub-laminate 74 taken from the 3-D model 62 of the full laminated part depicted in FIG. 7. The bounding box 72 defines the boundary where the full laminated part will be cut to extract the new sub-laminate 74 (in a manner analogous to a cookie cutter forming a cookie from dough). The boxing operation is used to reduce the file size by two or three orders of magnitude. The bounding box 72 intersects the tooling surface at edge-of-part contour line 76. The bounding box 72 is generated by extruding the rectangle 70 for a specified length in opposite directions parallel to the Z-axis. The specified depth of the bounding box 72 is defined by the user. The dimensions of rectangle 70 (the length and width of the bounding box 72) are computed as previously described.

The system and methods proposed herein are configured to optimize composite structure repair modeling, simulation, and production of digital data to facilitate a bonded scarf repair of a composite laminate or sandwich panel. Composite scarf repairs are designed according to the underlying ply geometry and fiber orientation for each ply at the discrepancy location of the specific component to be repaired. The technology proposed herein provides a virtual environment that enables engineers to optimize a repair design and provide the most robust repair solution that meets structural requirements (e.g., engineering specifications) while minimizing the material removal and the impact to the aircraft structure. Scarf repair designs are subsequently transmitted to repair technicians for manual scarfing via printed templates or automated/robotic scarfing using converted computer-readable code. More specifically, the technology proposed herein provides the necessary geometric details to allow machining code to be created to support semi-automated and automated scarfing processes. Furthermore, the technology proposed herein provides the digital data for automated repair ply cutting.

In accordance with one embodiment, the repair tool receives a model defining the underlying ply number/arrangement in an area of interest. This information is then processed in conjunction with information from a user-supplied file that describes or characterizes (e.g., by specifying the size, shape, depth, and location of) a discrepancy or anomaly to be repaired or repaired. The system then calculates the number of plies to be scarfed as well as the overlaps for each scarfed ply boundary depending on the input taper ratio desired by the user. An optimization algorithm automatically computes and develops a repair configuration that reduces the impact to the structure by adjusting scarf taper ratios when pad-up plies are present—a process that is difficult for a human to do in a reasonable amount of time. The data generated is then transmitted to a repair technician via printed templates and graphics, or the data can be further processed to generate and output electronic data files for automated ply cutting, robotic machining operations, semi-automated machining operations, and stored for digital thread connectivity by producing a digital twin of the repaired or repaired aircraft configuration.

In particular, it is noteworthy that robotic scarfing has been developed, but lacks an ability to identify unique ply geometry; it can only scarf basic shapes that would require further manual processing. The technology proposed herein solves that problem by providing details for appropriate scarfing specific to the repair location and ply arrangement at that location. Key technical aspects require the offset methodology to be applied to all part shapes with any material type and unique ply configurations.

In addition, the scarf and bond repair application 28 proposed herein can create a virtual repair patch with each individual repair ply in the patch having its own unique geometrical shape, fiber orientation, and material and with the plies ordered in accordance with a ply stacking sequence. From the 3-D model of the patch, the scarf and bond repair application produces a patch template as a 2-D projected plan view drawing and also creates individual flattened ply templates for each of the plies in the patch. The flattened geometry is derived from the 3-D patch model as well as the 2-D drawing package.

Figure 9:
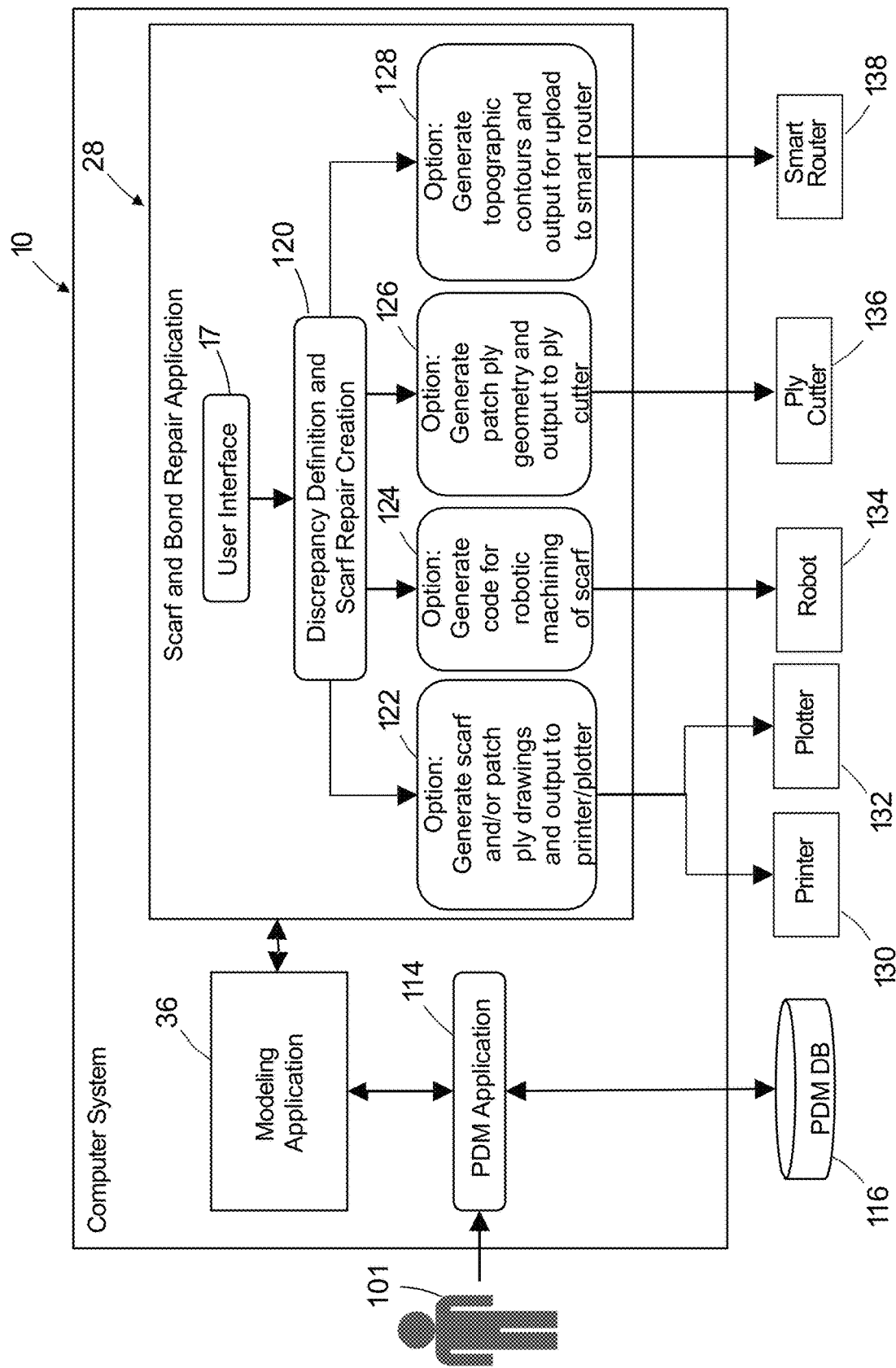
FIG. 9 is an architectural diagram depicting the process flow to design a scarfed laminate model and output drawings for technical reference.

FIG. 9 is an architectural diagram depicting a process flow to design a model of a scarfed laminate and later output drawings for technical reference. The computer system 10 is configured to execute instructions which are included in various software modules. The computer system 10 hosts a scarf and bond repair application 28, a product data management application 114 (hereinafter "PDM application 114"), and a modeling application 36. A user 101 may input information into a PDM database 116 via the PDM application 114. The modeling application 36 is integrated with the PDM application 114.

The modeling application 36 is configured to manipulate modeled objects. A modeled object is any object defined by data stored, e.g., in a database. As used herein, the term "modeled object" designates the data representing the model. A number of systems and programs are commercially available for the design and manufacture of objects. Computer-Aided Design (CAD) relates to software solutions for designing an object. For example, a CAD system may provide a representation of CAD modeled objects using edges or lines, in certain cases with faces or surfaces. Specifically, a CAD file contains specifications, from which geometry may be generated, which in turn enables a representation to be generated. In accordance with the technology proposed herein, the scarf and bond repair application 28 is designed and programmed to create CAD models which represent composite laminate models.

The PDM application 114 is communicatively coupled to the PDM database 116. In accordance with one embodiment, the PDM database 116 is an object-oriented database that includes all data pertinent to a deliverable product, including metadata and attributes of objects. This data can be in the form of CAD files, engineering documents, trade studies, etc. For example, the PDM database 116 may include all of the objects stored in repository 42 identified in FIG. 1. More specifically, PDM database 116 includes the CAD files created by the scarf and bond repair application 28 in conjunction with the modeling application 36. This allows for a single source for data storage and retrieval.

In accordance with one implementation, the software depicted in FIG. 9 may comprise a suite of products from Dassault Systemes S.A. of Suresnes Cedex, France. Dassault's software suite includes the CATIA V5 3-D modeler (CAD tool), which is capable of altering CAD models based on raw data that is input into the system. The Dassault suite also includes ENOVIA, which is a PDM system that enables the creation of dynamic, knowledge-based products, processes, and resources. The Dassault Systemes CAD modeling environment consists of the CATIA V5 3-D modeler and the ENOVIA LCA product data model.

Still referring to FIG. 9, the scarf and bond repair application 28 includes a user interface 17, a simulation software module 120 configured to perform functions including discrepancy definition and scarf repair creation, and post-simulation software modules 122, 124, 126, and 128 which are configured to provide respective post-simulation options. As used herein, the term "scarf repair creation" includes generation of the scarfed laminate model using a scarfing function (an algorithm implemented in computer code) and generation of the patch model using a patch generator function (also an algorithm implemented in computer code).

Post-simulation software module 122 enables computer system 10 to generate files containing digital data representing scarf and/or patch ply drawings and export those files to a printer 130 or plotter 132. Post-simulation software module 124 enables computer system 10 to generate code for robotic machining of a scarf and output that code to a robot 134 (or a CNC machine). Post-simulation software module 126 enables computer system 10 to generate files containing digital data representing patch ply geometry and export those files to a ply cutter 136. Post-simulation software module 128 enables the computer system 10 to generate files containing digital data representing topographic contours and export those files to a hand-held smart router 138 (or a three-axis milling machine). In the alternative, templates could be created from the generated topographic contours and a typical hand-held router could be manually operated to cut in accordance with the template.

To perform a tapered scarf, a five-axis mill may be employed. Fully automated taper sanding may be accomplished by a five-axis (or higher) robotic arm. The post-simulation software module 124 is configured to convert the digital scarfed laminate model into G-code for the robot 134. The scarf and bond repair application 28 is coded to trigger the post-simulation software module 124 to generate the G-code.

An automated ply cutter may be used to cut the ply patches for repair of a composite laminate. The post-simulation software module 126 generates files containing digital data representing patch ply geometry. More specifically, the patch ply geometry is characterized by individual flattened ply templates for each of the plies in the simulated patch. The flattened geometry is derived from the 3-D patch model as well as the 2-D drawing package. More specifically, a flattening algorithm in the CAD modeling program is used to flatten the plies so that the size and shape are accurate.

The post-simulation software module 126 includes code to control and invoke the flattening process and then produce the repair ply templates. The post-simulation software module 126 also has the ability to output digital files from the individual ply templates to an automated ply cutter. These digital files specify the flattened ply contours for the repair plies from which the patch is constructed for use by a ply cutting machine. The automated ply cutting method further includes placement of a ply in the ply cutting machine and activation of the ply cutting machine to cut the ply to form one of the repair plies having a flattened ply contours as specified in the digital file.

The smart router 138 is a commercially available off-the-shelf tool that is largely hand operated, but the router has limited automatic control for the X, Y, and Z axes similar to a CNC router. The smart router 138 has a screen that displays a camera image of the area on the surface underlying the router where cutting is to occur. An image of the topographic contours is superimposed on the image of the repair area for viewing by the person operating the router. The repair technician guides the router so that the milling bit (cutter) is close to the line; then the automated functionality of the router keeps the milling bit on the line at the specified depth. The smart router 138 only has 2.5-axis milling capability, so the repair technician cannot do a complete tapered scarf with it—only a rough cut that is stepped (not tapered) to remove the majority of the material.

The smart router 138 requires a digital file of the contours that the repair technician wants to cut. The post-simulation software module 128 is configured to convert the scarfed laminate model into the topographic contours where each contour is an elevation or depth from the part surface similar to the way a topographic map has contour or elevation lines for depth or height from sea level. The resultant material removal is a stepped scarf because the router bit is a flat end mill and the smart router cannot perform a tapered scarf. The final scarfing is done by hand to create a smooth taper and remove the steps and clean the scarf up. Thus, this scarfing method is semi-automated, not fully automated. The scarf and bond repair application outputs the contours as vector graphics files (.svg) that the software for the smart router will accept.

Figure 10:
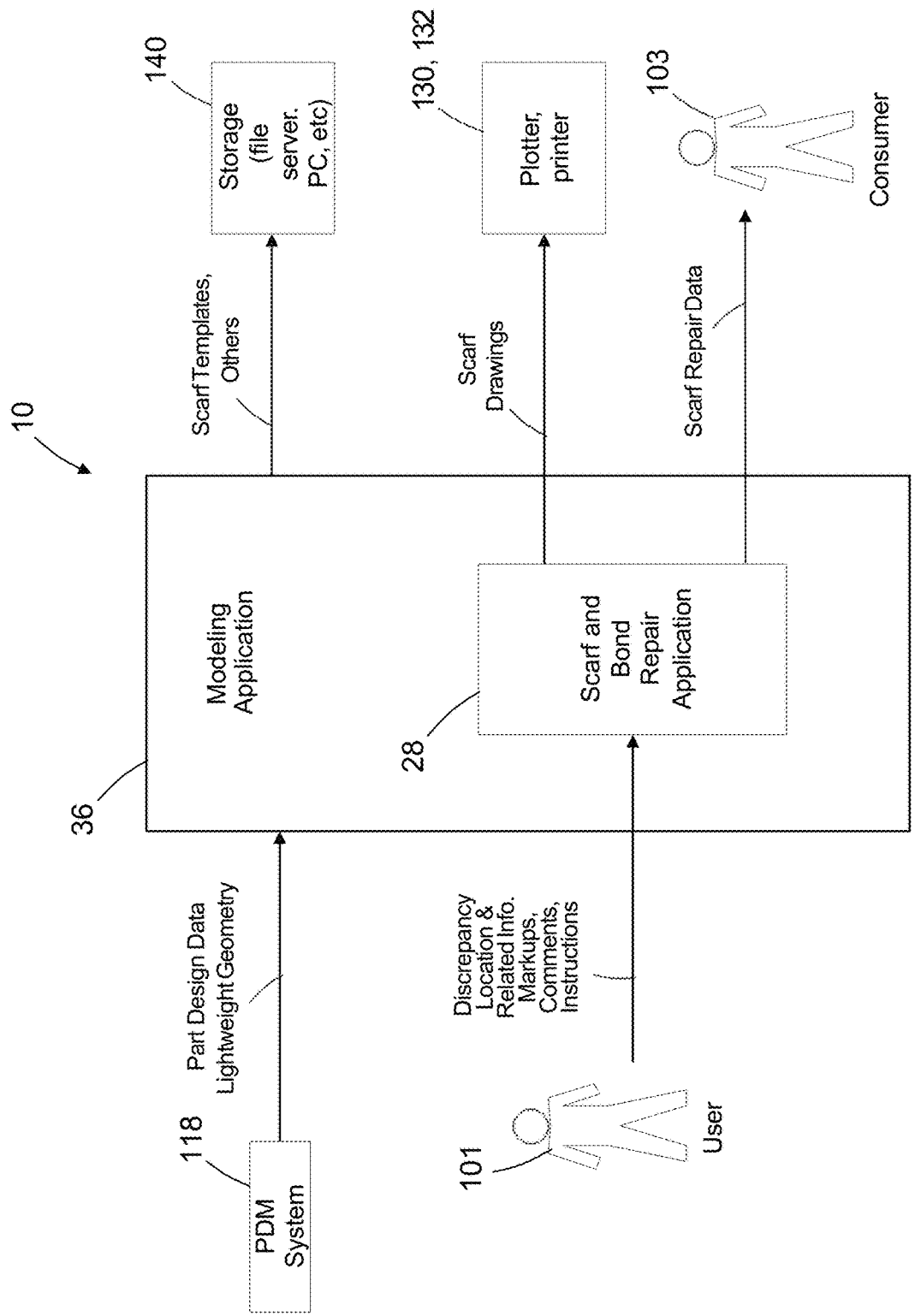
FIG. 10 is a system architecture-context diagram representing (at a high level) an enhanced repair design system and its interactions with external users.

FIG. 10 is a system architecture—context diagram representing (at a high level) a computer system 10 programmed to enable enhanced repair design and the computer's interactions with a user 101 and a consumer 103 (e.g., a repair technician). The scarf and bond repair application 28 is an add-on application that is operated from within the modeling application 36.

The user 101 may input discrepancy location and related information, markups, comments, and instructions into the scarf and bond repair application 28. The modeling application 36 retrieves relevant part design data and lightweight geometry data from a PDM system 118 in dependence on the information input by user 101. Based on the information input by user 101 and the information retrieved from the PDM system 118, the scarf and bond repair application 28 interacts with the modeling application 36 to generate 3-D models and 2-D templates of the virtual scarf and virtual patch.

In addition, the scarf and bond repair application 28 is configured to output files for displaying 2-D and 3-D drawings, code for robotic machining, patch ply geometry for ply cutting, and topographic contour maps. The modeling application 36 is configured to output the scarf and patch templates to storage 140. Storage 140 may include a file server, a personal computer, etc. In the example depicted in FIG. 10, the scarf and bond repair application 28 is configured to output scarf drawings to a printer 130 or plotter 132 and output scarf repair data to a consumer 103 (e.g., a repair technician). Other outputs depicted in FIG. 9 are not repeated in FIG. 10.

Figure 11:
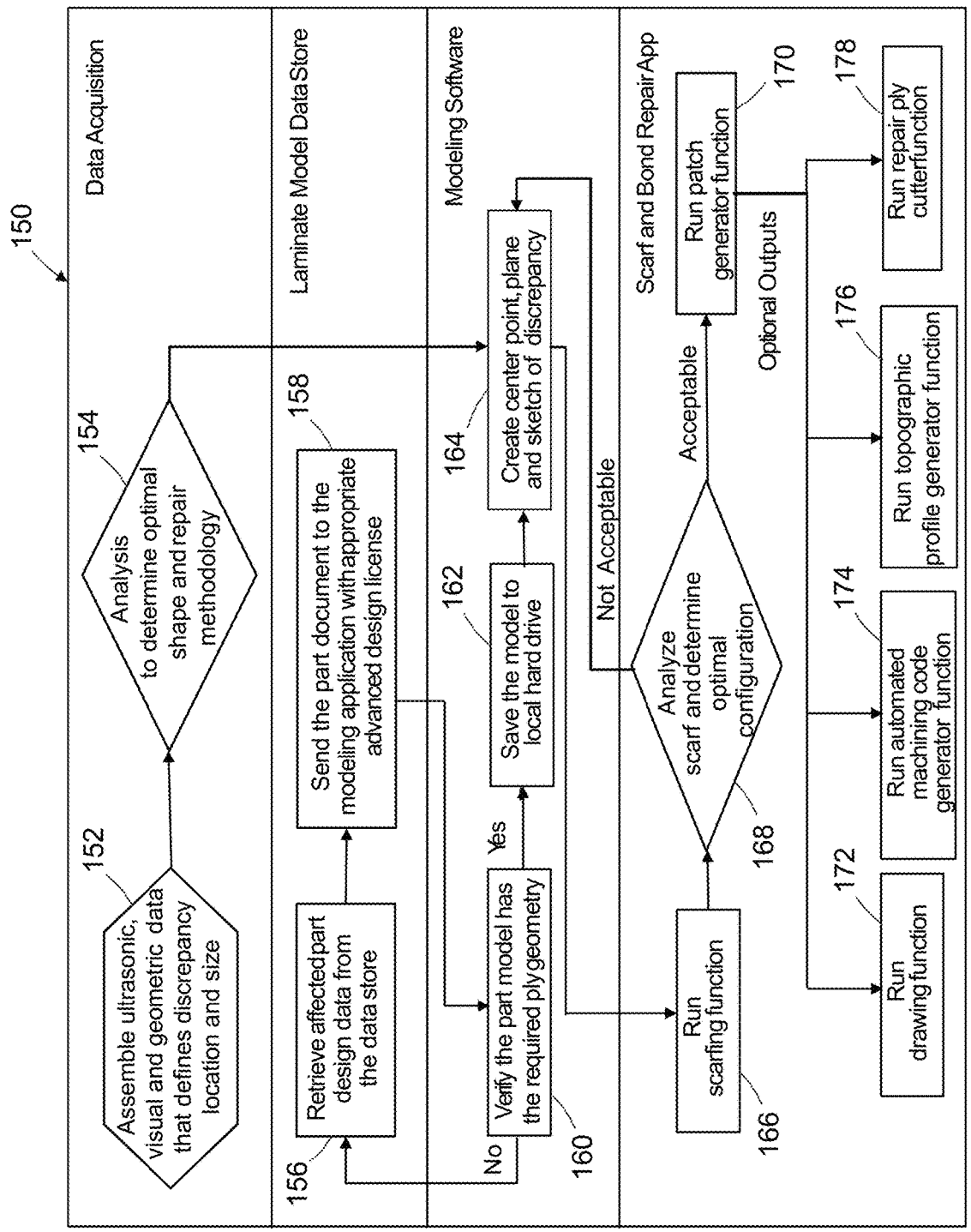
FIG. 11 is a flowchart identifying steps of a method for generating a template of a scarfed section and a model of a patch with optional outputs to support manual or automated repairing.

FIG. 11 is a flowchart identifying steps of a method 150 for generating a template of a scarfed section and a model of a patch with optional outputs to support manual or automated repairing. The first phase of method 150 is data acquisition by the user 101. The user 101 assembles ultrasonic, visual, and geometric data that defines the location and size of the discrepancy that requires repairing or repair (step 152). An analysis of the acquired data is performed to determine an optimal scarf shape and repair methodology (step 154).

Next the design data for the affected laminated part is retrieved from a laminate model data store (step 156). The resulting part document is then sent to the modeling application (step 158). The user verifies whether the part model has the required ply geometry or not (step 160). If the part model does not have the required ply geometry, step 156 is repeated. If the part model has the required ply geometry, the part model is saved to the local hard drive (step 162). The analysis results of step 154 and the part model are then used to create a center point, plane, and sketch of the discrepancy (hereinafter "discrepancy sketch") (step 164).

The scarf and bond repair application then runs a scarfing function (step 166). Based on the discrepancy sketch, the scarfing function generates a scarfed laminate model including a virtual scarf. The scarfed laminate model is then analyzed by the user to determine whether the virtual scarf has an optimal configuration or not (step 168). If the first sub-laminate model does not meet the requirements of the user, then the process returns to step 164 and the user adjusts the modeling parameters as required to produce a new sub-laminate model. These steps are repeated by the user until the product meets the engineered requirements and then the user can invoke the subsequent operations via the user interface.

Repair optimization is computed by an algorithm that is coupled to a stress analysis function that computes the laminate capability and perform stress analysis to determine the optimal taper ratio and scarf shape to maintain margins of safety while minimizing impact to the structure. If the user in step 168 determines that the configuration of the virtual scarf is acceptable (or optimal), then the scarf and bond repair application runs a patch generator function (step 170). The patch generator function is configured to generate a virtual patch that matches the virtual scarf with the required ply overlaps and any additional structural plies required according to the optimization algorithm and policy.

The data representing the virtual scarf and virtual patch are then converted into optional output formats. In accordance with various embodiments, the scarf and bond repair application may be configured to run one or more of the following functions: (a) a drawing function (step 172); a robotic machining function (step 174); a topographic profile function (step 176); and a repair ply cutter function (step 178).

Figure 12:
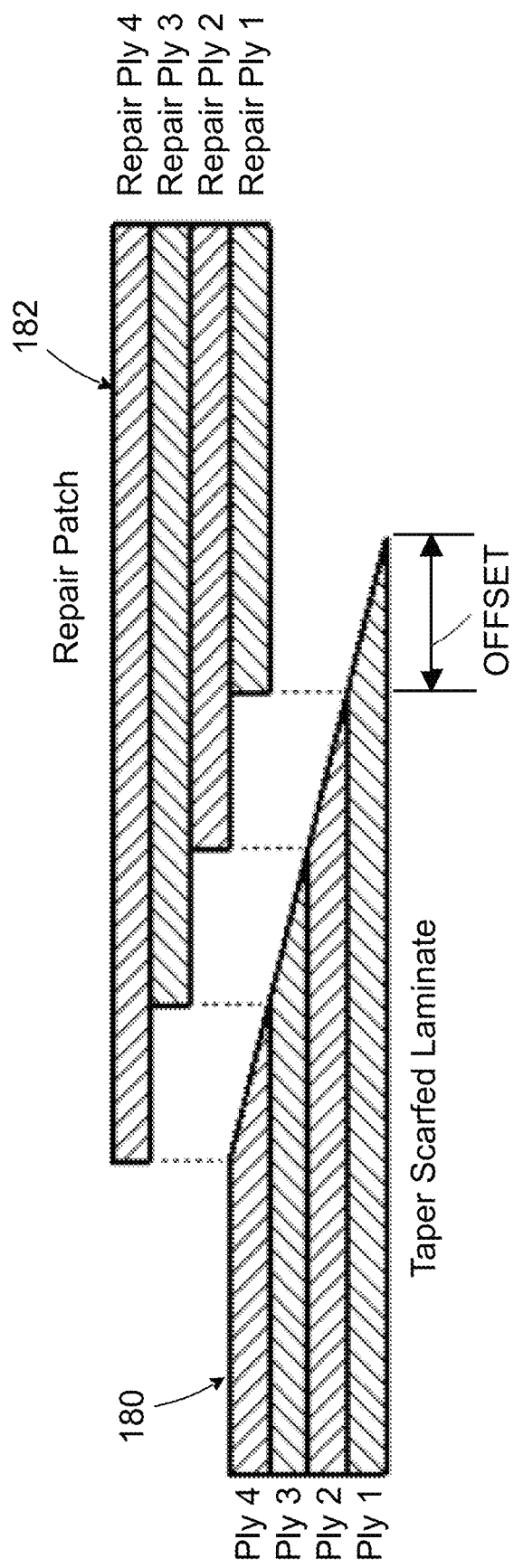
FIG. 12 is a diagram representing a sectional view of a portion of a repair patch (consisting of four repair plies) being aligned with a portion of a tapered scarfed laminate (consisting of four plies).

In a typical repair scenario, the composite laminate may have a constant number of plies in an area of interest (e.g., where a discrepancy or anomaly is present). In such a situation, the repair patch is typically designed to have the same number of repair plies, each repair ply having the same thickness and same fiber orientation as the ply which the repair ply is intended to repair. FIG. 12 is a diagram representing a sectional view of a portion of a repair patch 182 (consisting of four repair plies) being aligned with a portion of a tapered scarfed laminate 180 (consisting of four plies). Each repair ply overlaps the tapered portion of the respective ply that is being repaired. More specifically, when the repair patch 182 is fused to the tapered scarfed laminate 180, the Repair Plies 1-4 respectively fuse with Plies 1-4.

Figure 13:
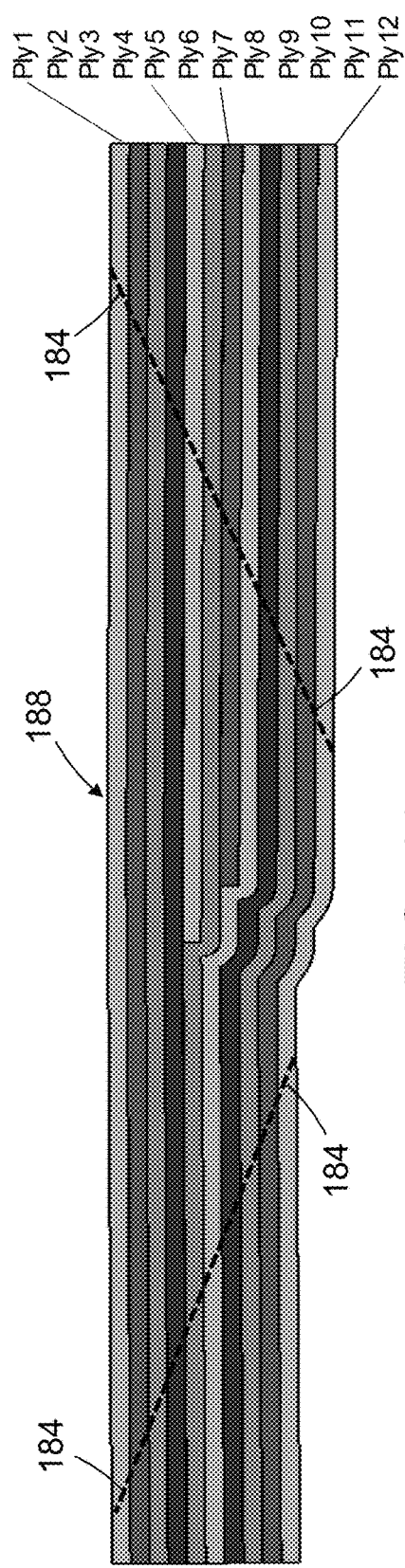
FIG. 13 is a diagram representing a sectional view of a portion of a composite laminate that includes a pair of pad-up plies. The dashed lines indicate where a tapered scarfed surface may be formed.

The technology proposed herein is also capable of simulating scarfed sections of composite laminates in which the thickness varies due to the presence of pad-up plies. A pad-up ply is a reinforcing ply that does not cover the entire repair area. FIG. 13 is a diagram representing a sectional view of a portion of a 12-ply composite laminate 188 that includes a pair of pad-up plies (Ply 5 and Ply 7). The dashed lines 184 indicate where a full-depth tapered scarfed surface is formed in the composite laminate to remove a discrepancy (not shown).

Figure 14:
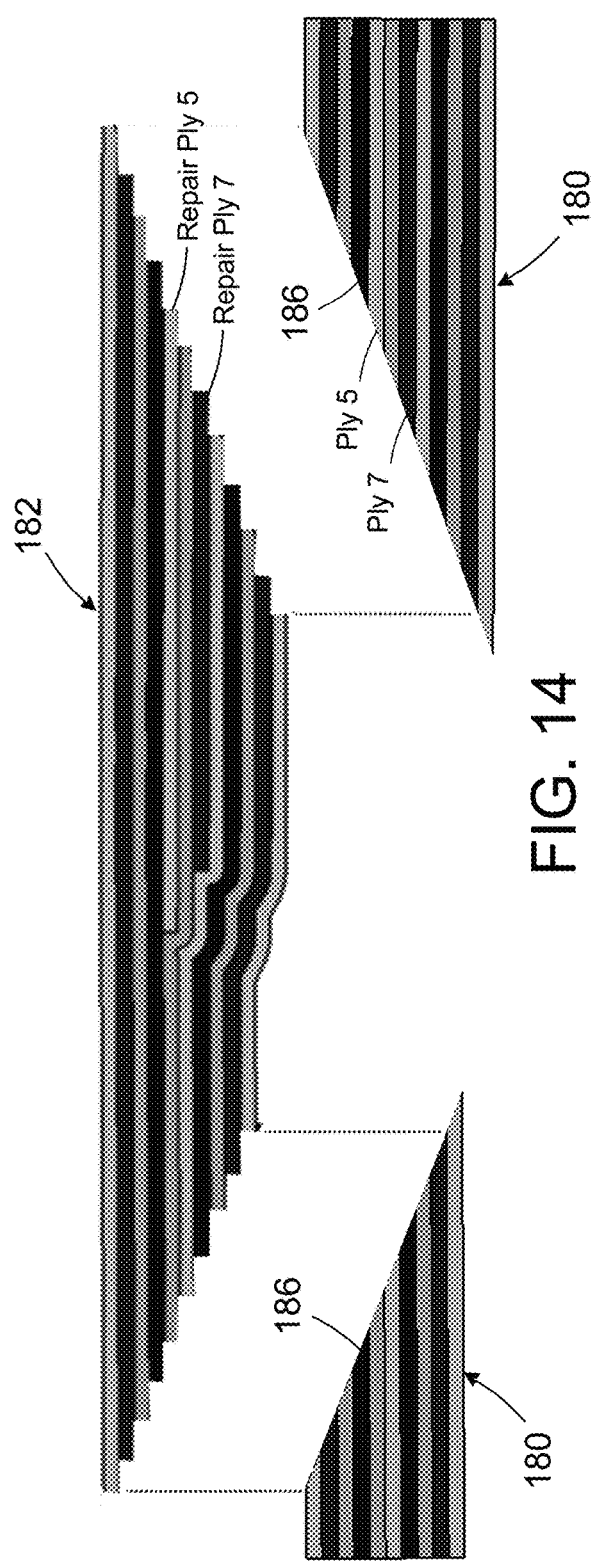
FIG. 14 is a diagram representing a sectional view of the portion of the composite laminate depicted in FIG. 13 after formation of the tapered scarfed surface and prior to installation of a repair ply having a pair of pad-up plies that match the pad-up plies of the composite laminate.

FIG. 14 is a diagram representing a sectional view of the portion of the composite laminate 188 depicted in FIG. 13 after formation of the tapered scarfed surface 186 and prior to installation of a repair patch 182 having a pair of pad-up plies (Repair Ply 5 and Repair Ply 7) that match the pad-up plies (Ply 5 and Ply 7) of the composite laminate 188. The vertical dotted lines in FIG. 14 illustrate the overlap of the repair plies with the scarfed plies when the repair patch 182 is properly aligned with the tapered scarfed surface 186.

FIGS. 15A-15D are drawings representing plan views of ply boundaries extracted from computer-generated 2-D colorized images of four stages in a simulated scarf and bond repair process. The resulting contour lines indicating the ply boundaries for a scarf template 232 representing a full-depth scarfed section of a composite laminate that includes pad-up plies 236 and 240. The thickness of the composite laminate in the area of the pad-up plies is greater than the thickness elsewhere. In this example, the scarfed section includes twelve plies, two of which are pad-up plies; the opening 231 in the bottom (first) ply 233 is circular; and the scarf taper ratio in the +Y direction (in the area of lesser thickness) is equal to the scarf taper ratio in the Y direction (in the area of greater thickness). The result is that the distance of the inner perimeter of top ply 241 from the origin of the X-Y coordinate system is greater in the +X, −X, and −Y directions than in the +Y direction, the result being that the scarf template 232 has an irregular shape.

Figure 15A:
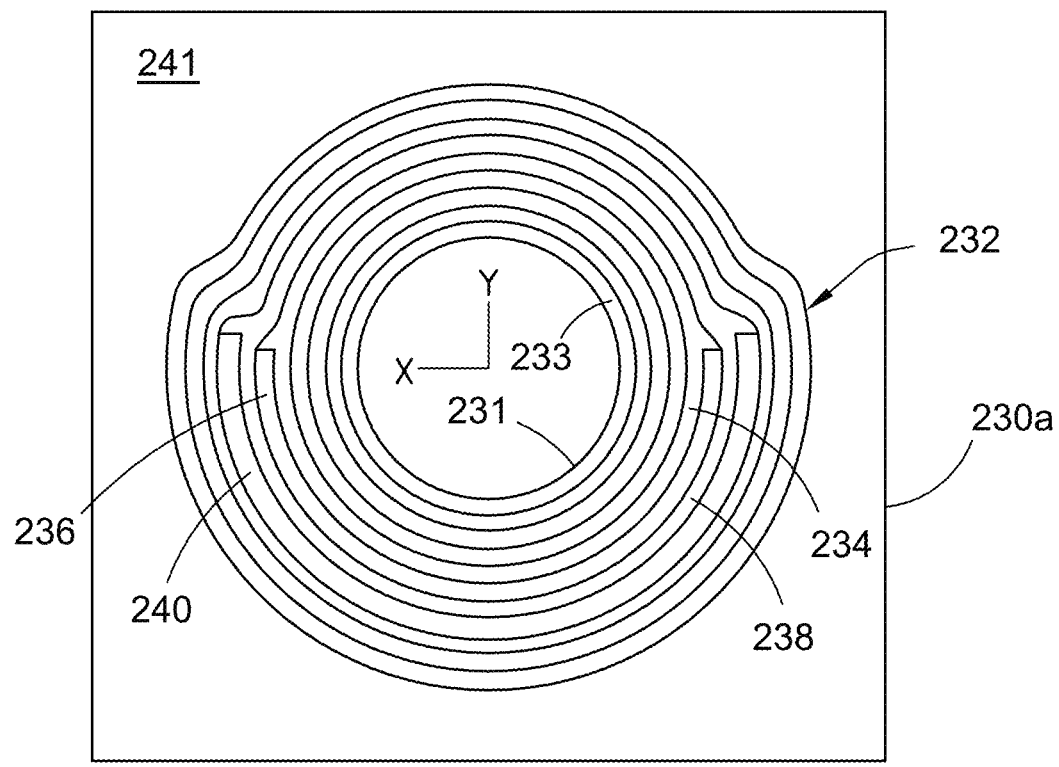
FIGS. 15A-15D are drawings representing plan views of ply boundaries extracted from computer-generated 2-D colorized images of four stages in a simulated scarf and bond repair process involving a scarfed section that includes pad-up plies.

FIG. 15A shows a display window 230*a* presenting a plan view of ply boundaries of scarf template 232 which is a computer simulation of a scarfed section of a 12-ply composite laminate. The stack of plies in the example depicted in FIG. 15A includes the following plies: a bottom (first) ply 233; a second ply overlying a portion of bottom ply 233 and offset therefrom; a third ply overlying a portion of the second ply and offset therefrom; a fourth ply overlying a portion of the third ply and offset therefrom; a fifth ply 234 overlying a portion of the fourth ply and offset therefrom; a pad-up (sixth) ply 236 overlying a portion of the fifth ply 234 and offset therefrom; a seventh ply 238 overlying respective portions of the fifth ply 234 and pad-up ply 236 and offset therefrom; a pad-up (eighth) ply 240 overlying portions of the seventh ply 238 and offset therefrom; a ninth ply overlying respective portions of the seventh ply 238 and pad-up ply 240 and offset therefrom; a tenth ply overlying a portion of the ninth ply and offset therefrom; an eleventh ply overlying a portion of the tenth ply and offset therefrom; and a top (twelfth) ply 241 overlying a portion of the eleventh ply and offset therefrom.

During the computer simulation of a virtual patch, a multiplicity of repair plies are simulated to respectively match the simulated ply offsets depicted in FIG. 15A. For example, a circular first repair ply (not shown in FIGS. 15A-15D) is placed over the opening 231 with its outer perimeter overlapping the offset of the bottom ply 233. Then circular second, third and fourth repair plies (not shown in FIGS. 15A-15D) are stacked in sequence on top of the first repair play.

Figure 15B:
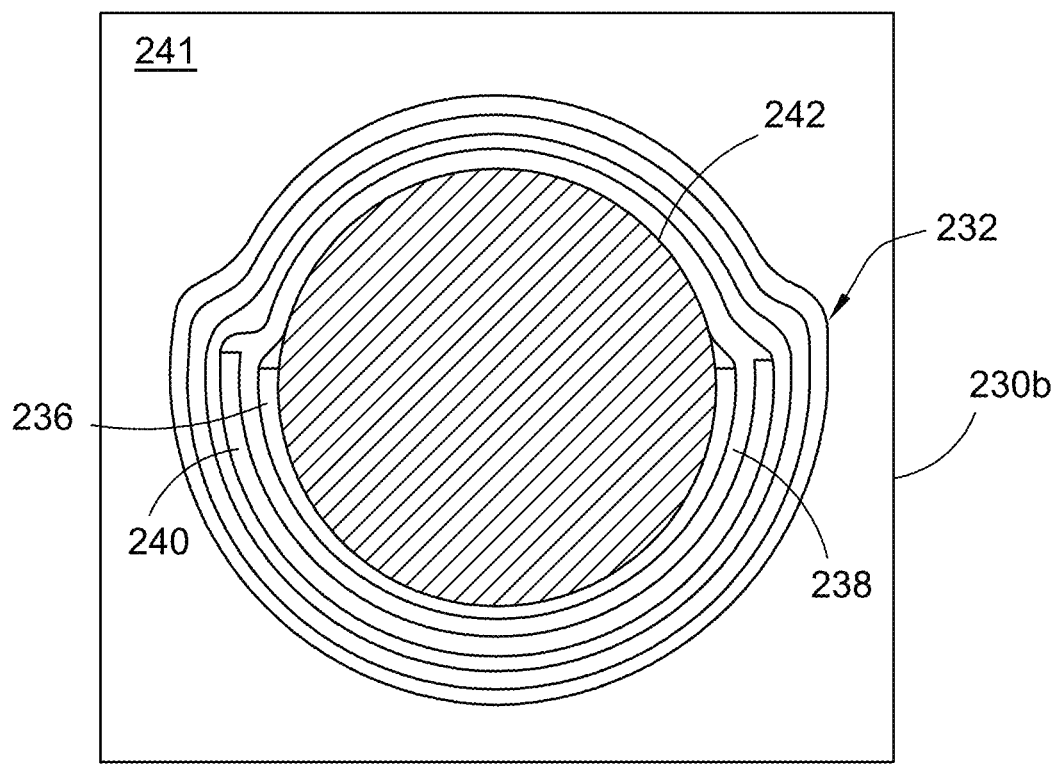
Figure 15C:
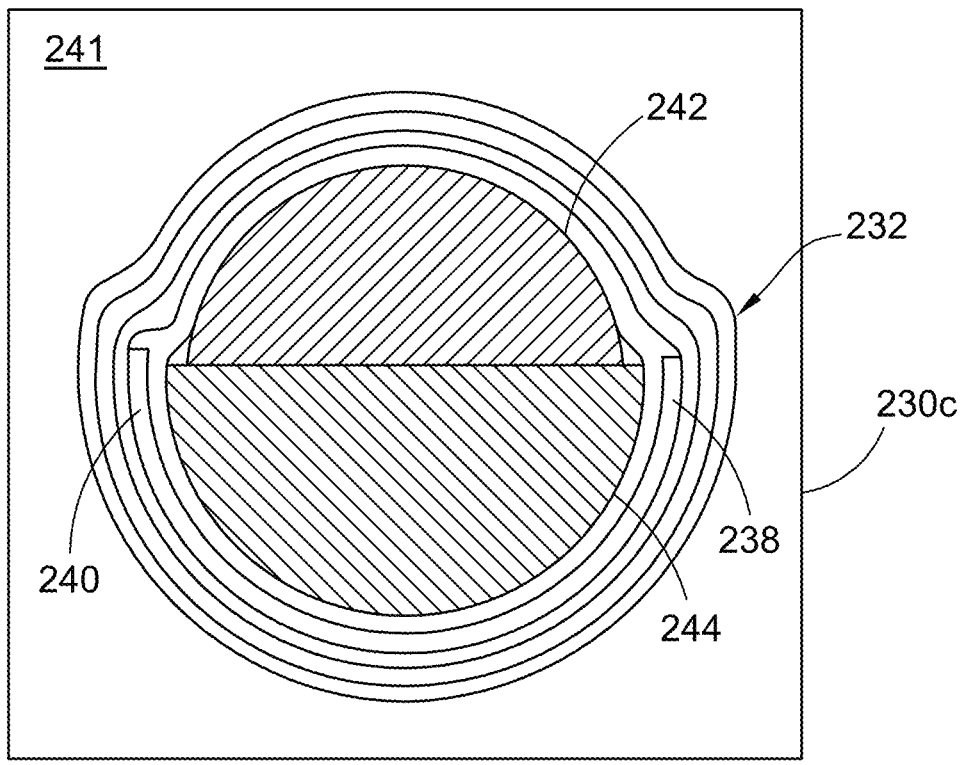
Figure 15D:
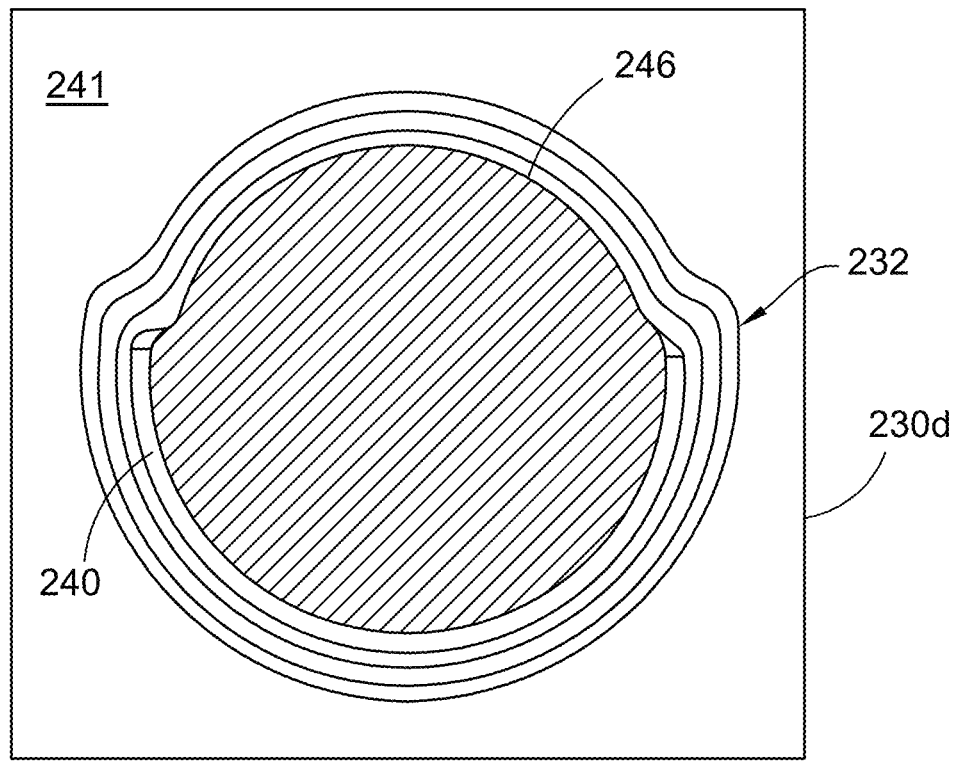

FIG. 15B shows a display window 230*b* presenting a plan view representing a simulation of a circular fifth repair ply 242 being placed over the fourth repair ply with its outer perimeter overlapping the offset of the fifth ply 234. FIG. 15C shows a display window 230*c* presenting a plan view representing a simulation of a non-circular pad-up repair ply 244 being placed over a portion of the circular fifth repair ply 242 with its outer perimeter overlapping the offset of the pad-up ply 236. FIG. 15D shows a display window 230*d* presenting a plan view representing a simulation of a non-circular pad-up repair ply 246 being placed over respective portions of circular fifth repair ply 242 and non-circular pad-up repair ply 244 with its outer perimeter overlapping the offset of ply 238.

For the sake of illustration, the software modules of a scarf and bond repair application in accordance with one proposed implementation that minimizes material removal when pad-up plies are present will now be described in some detail. It may be appreciated, however, that a described function may be omitted if not pertinent to a particular application.

As previously described, the user interface 16 (see FIG. 9) allows the user to select the location of a scarf template center point 68 (see FIG. 8). The center point is a point that is placed on the laminate model at or near the center of the discrepancy. The center point is used to anchor the discrepancy sketch that defines the discrepancy and is also the point that is initially probed (e.g., core sampled) by the repair tool to extract the ply stacking data at that point. The user interface 16 also allows the user to select the appropriate sketch—either manually created or created from a template. The user interface 16 also allows the user to define the desired scarf.

More specifically, the user may define the scarf depth, the side of the part to be scarfed, and the X, Y, and Z dimensions for a boxing algorithm that effectively crops the part and creates a sub-laminate part to be scarfed. The user may also select a scarfing algorithm to be used. The scarfing algorithm is selected from the following group: a so-called "simple offset scarf" algorithm that enables the scarf taper ratio to have different values in the X and Y directions, but does not adjust scarf taper ratios taking into account pad-up plies; a "minimized material removal" algorithm that is configured to adjust scarf taper ratios in the X and Y directions to reduce the amount of material removed when pad-up plies are present in the sub-laminate part; and a "smoothed offset scarf" algorithm that is configured to adjust scarf taper ratios in any direction to reduce the amount of material removed when pad-up plies are present in the sub-laminate part. Directions are defined in the sketch interface for each radius or straight line segment in the sketch.

The user may also select whether the scarf is to be single or double sided. A scarf repair can be conducted from a single side where all of the discrepancy is extracted from one side and the scarf taper is common to the singular side. Alternatively, the scarf repair can be conducted from both sides of the laminate where portion of the plies are repaired from the outer mold line and portions of the plies are repaired from the inner mold line. If a double-sided scarf is selected, then the user determines the bondline location (where two patches are to be bonded) in terms of number of plies or percentage from the tooled side of the sub-laminate.

Following the input of the foregoing definitions and selections, the user may request engagement of boxing and sub-laminate generator functions (included in the simulation software module 120 of the scarf and bond repair application 28 identified in FIG. 9). As previously mentioned, to improve the efficiency of the scarf and bond repair application 28, the data is pared down (reduced) by cutting out a small region of the laminated part in the area of interest and generating the new sub-laminate 74 (shown in FIG. 8). More specifically, the boxing function is used to generate a new edge-of-part contour line 76 for the new sub-laminate 74. The boxing function is configured to generate a bounding box 72 that is the defining boundary of where the full laminate is to be cut to extract the new sub-laminate 74.

The boxing and sub-laminate generator functions (incorporated in the simulation software module 120 shown in FIG. 9) automatically trim or crop the plies within the boundaries of the extruded box to generate a new sub-laminate with cropped plies. More specifically, the data representing a model of a new sub-laminate is extracted from the original file containing the data, thereby greatly reducing file size and data processing time.

The scarfing function is also included in simulation software module 120 (see FIG. 9). The scarfing function is also an automated function driven by the inputs of the user interface. The scarfing function operates on the model of the nominal new sub-laminate to generate a model of a scarfed new sub-laminate (also referred to herein as the "scarfed laminate model"). The scarfing function trims each ply using the boxing function. First, the scarfing function core samples the ply stack and determines all plies that lie within the boxing perimeter. Then the scarfing function generates new ply stacking with all ply properties duplicated from the original model for all plies that were encountered by the core sampling.

More specifically, the scarfing function determines the ply at the deepest depth according to the direction (from the inner mold line (IML) surface or the outer mold line (OML) surface) defined by the user and trims the ply to the discrepancy sketch perimeter. The scarfing function then extrapolates the boundary of the previously trimmed ply inner contour and creates a new larger offset contour. The offset is computed by multiplying the user-defined scarf taper ratio by the ply thickness and applying the scarfing algorithm selected by the user. Then the scarfing function trims the next ply in the sequence using the previously defined contour.

When a ply is encountered that only partially covers the repair area (known as a ply drop or pad-up ply), the offset function trims the pad-up ply, but the subsequent contour is altered to use the partial perimeter of the pad-up ply and the remaining contour of the ply prior to the pad-up ply to complete a closed contour that maintains the required offset distance according to the scarfing algorithm selected by the user. Offset contours are then used to trim the ply inside of the boundary.

The extrapolating and trimming steps are repeated for each ply in the stack that is within the maximum scarfing depth defined by the user. When the trimming has been completed, the system analyzes initial and resulting ply shapes to determine "micro-ply" conditions and automatically removes micro-plies from the scarf design and patch generation consideration in order to improve results and quality. Micro-ply determination may be based on minimum bounding box dimensions (e.g., length, width, diagonal), ply area, or percentage of maximum dimensions.

The specific value for determining to keep or not keep a micro-ply may be modified for the algorithm. For example, the scarfing function may be configured to perform micro-ply deletion by analyzing (calculating) the surface area of each ply and deleting any plies that have a surface area less than a specified threshold (e.g., 0.0625 square inches ($in^2$) ((10.24 square centimeters ($cm^2$))). The new scarfed laminate model is then automatically saved to the folder that contains the original model.

Figure 16A:
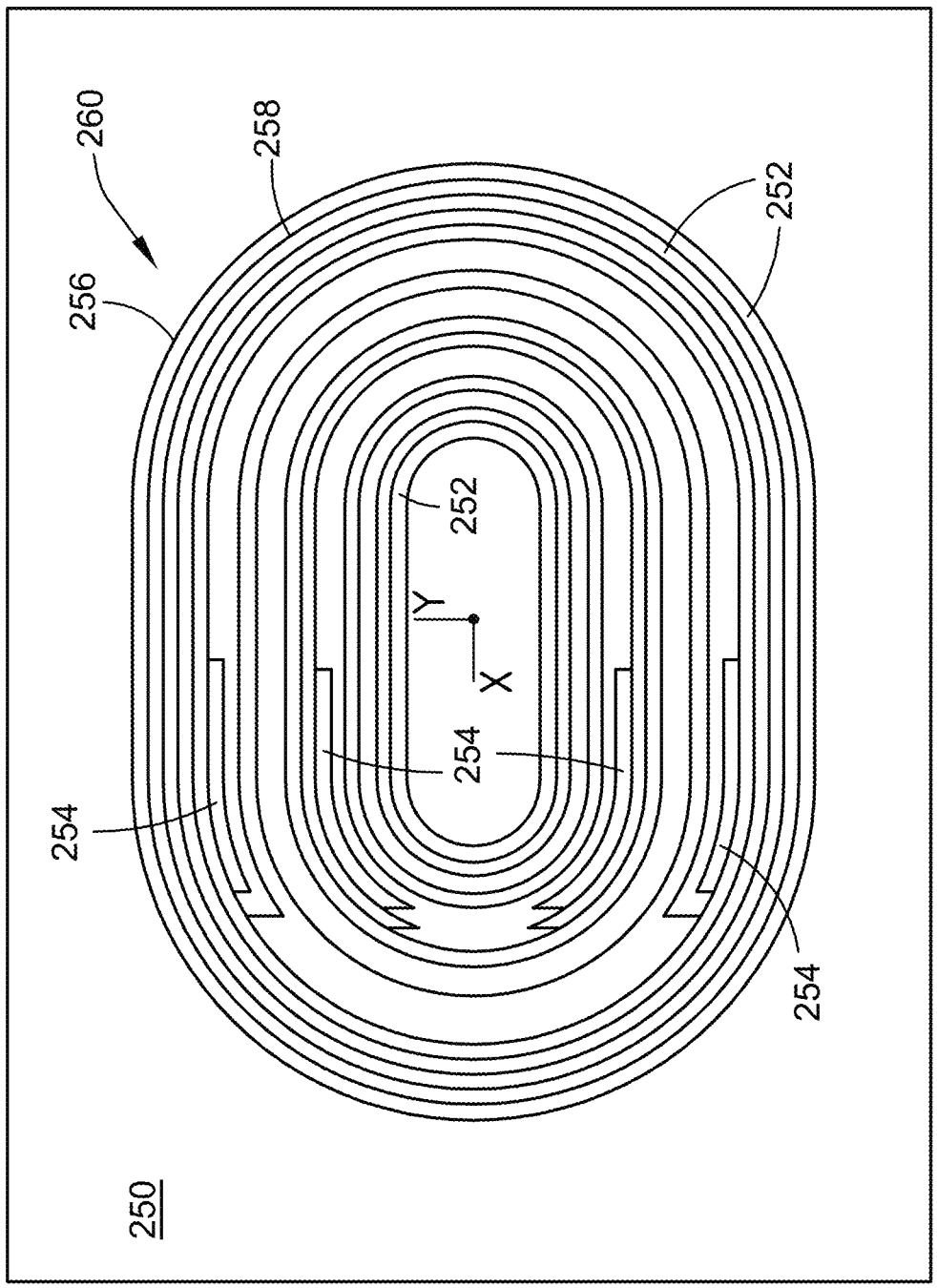
FIGS. 16A-16C are drawings representing plan views of ply boundaries extracted from computer-generated colorized templates of respective virtual scarfed sections, which scarf templates were generated using: (a) a "simple offset" algorithm (FIG. 16A); (b) a "minimized material removal" algorithm (FIG. 16B); and (c) a "smoothed offset" algorithm (FIG. 16C).

FIG. 16A is a diagram representing a plan view of ply boundaries extracted from a computer-generated colorized template of a virtual scarfed section 260, which scarf template was generated using the "simple offset" algorithm. The virtual scarfed section 260 simulates a composite laminate having a top ply 250, underlying plies 252, and pad-up plies 254 arranged in a stack. The depth of each scarfed ply in the stack increases from the top ply 250 to the bottom ply.

The inner perimeter of each simulated scarfed ply is indicated by a respective racetrack-shaped contour line in FIG. 16A. For example, the inner perimeter formed by simulated removal of material from the top ply 250 is indicated by a contour line 256, while the inner perimeter formed by simulated removal of material from the next lower ply formed is indicated by contour line 258. The offset inner perimeters of adjacent scarfed plies indicate that the underlying ply extends beyond the overlying ply and thus is visible in a plan view. In the example depicted in FIG. 16A, the semicircular segments of the racetrack-shaped offsets are concentric and the straight segments of the racetrack-shaped offsets are parallel.

In some examples, the width of the offset may be constant along the length of the racetrack. More specifically, the "simple offset" algorithm enforces a general policy (subject to exceptions) wherein the inner perimeter of one scarfed ply is offset from the inner perimeter of the next lower scarfed ply by an offset which is constant along the length of the racetrack. The "simple offset" algorithm enables the scarf taper ratio to have different values in the X and Y directions, but does not adjust scarf taper ratios taking into account pad-up plies. Thus, the "simple offset" algorithm is especially suitable for use when the scarfed section of the composite laminate does not include pad-up plies.

Figure 16B:
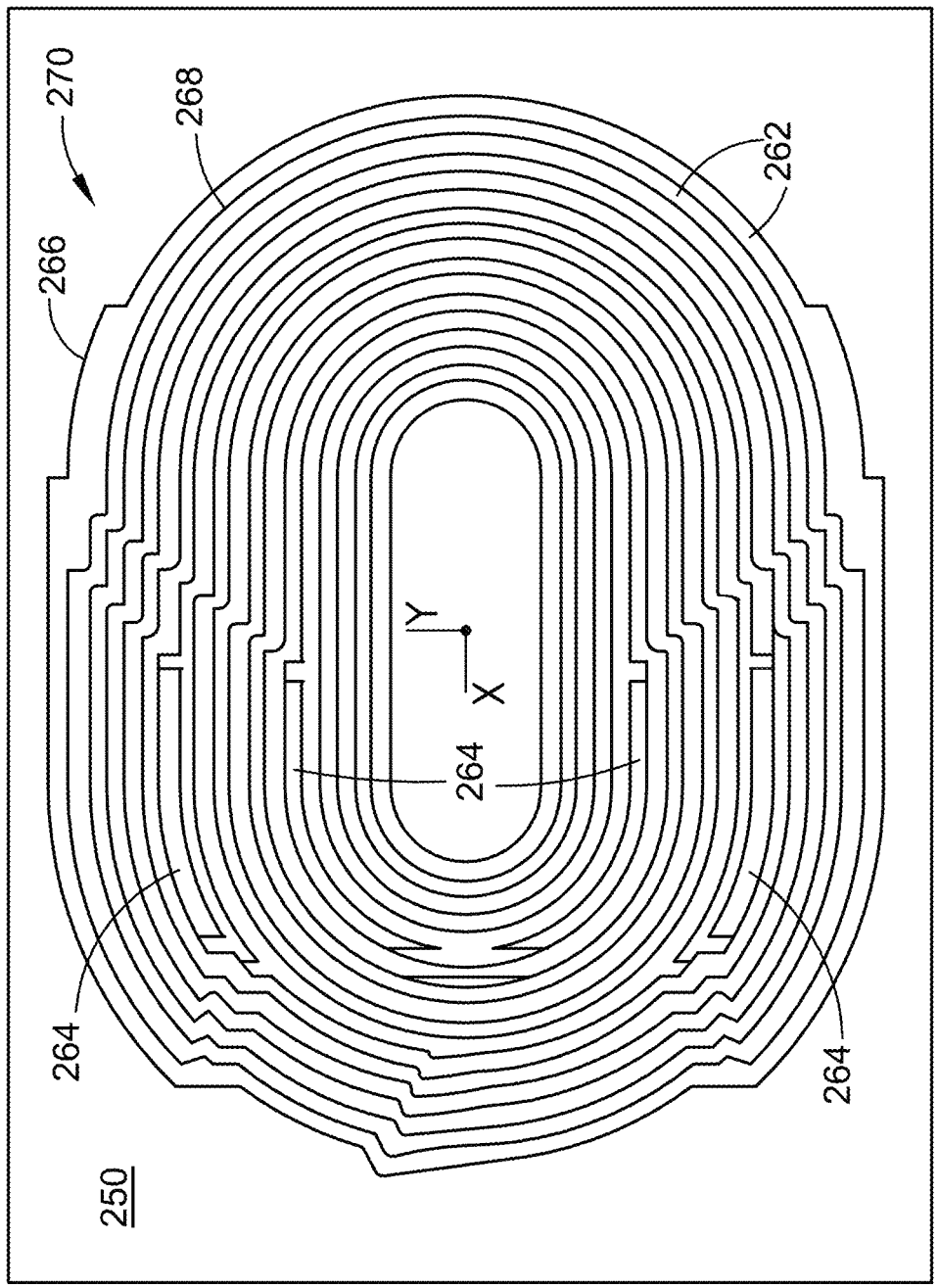

FIG. 16B is a drawing representing a plan view of ply boundaries extracted from a computer-generated colorized template of a virtual scarfed section 270, which scarf template was generated using the "minimized material removal" algorithm. The virtual scarfed section 270 simulates a composite laminate having a top ply 250, underlying plies 262, and pad-up plies 264 arranged in a stack.

The inner perimeter formed by simulated removal of material from the top ply 250 is indicated by a contour line 266, while the inner perimeter formed by simulated removal of material from the next lower ply formed is indicated by contour line 268. The inner perimeter of each simulated scarfed ply is indicated by a contour line which may have one or more irregular-shaped segments. For example, the inner perimeter of top ply 250 (indicated by contour line 266) has a stepped offset, while the inner perimeter of the next lower ply (indicated by contour line 268) also has a stepped offset. The "minimized material removal" algorithm is configured to adjust scarf taper ratios in the X and Y directions to reduce the amount of material removed when pad-up plies are present in the sub-laminate part.

Figure 16C:
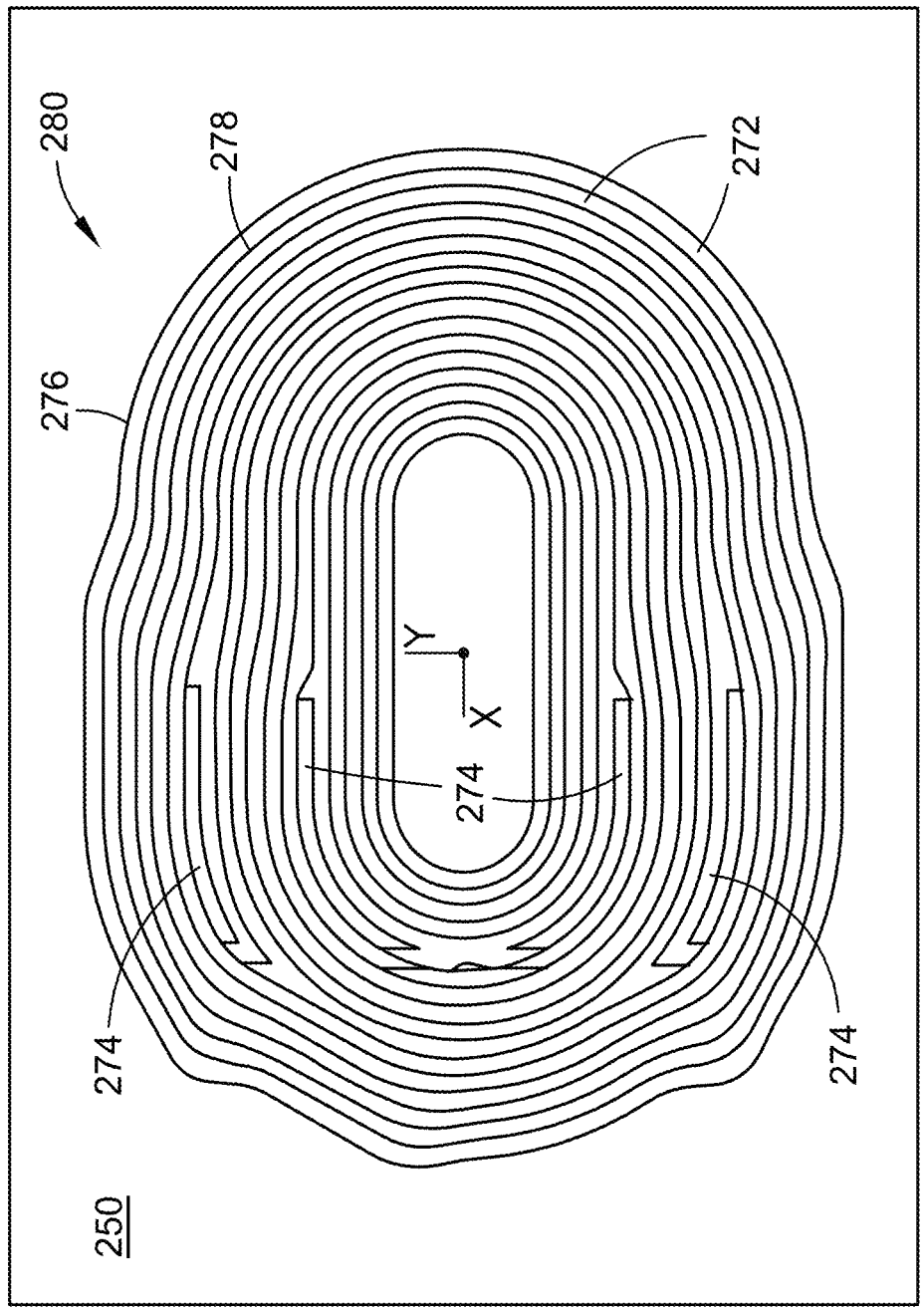

FIG. 16C is a drawing representing a plan view of ply boundaries extracted from a computer-generated colorized template of a virtual scarfed section 280, which scarf template was generated using the "smoothed offset" algorithm. The virtual scarfed section 280 simulates a composite laminate having a top ply 250, underlying plies 272, and pad-up plies 274 arranged in a stack. The inner perimeter formed by simulated removal of material from the top ply 250 is indicated by a contour line 276, while the inner perimeter formed by simulated removal of material from the next lower ply formed is indicated by contour line 278. For example, the inner perimeter of top ply 250 (indicated by contour line 276) has a stepped offset, while the inner perimeter of the next lower ply (indicated by contour line 278) also has a stepped offset. The "smoothed offset" algorithm is configured to adjust scarf taper ratios in any direction to reduce the amount of material removed when pad-up plies are present in the sub-laminate part.

More specifically, the "smoothed offset" algorithm is configured so that the scarfed ply offsets are initially based on the outline of the discrepancy appearing in the discrepancy sketch. A contour line of a simulated lowermost scarfed ply is created which surrounds the outline of the discrepancy at a depth corresponding to the depth of the discrepancy and is offset from the previous boundary in dependence on the product of the ply thickness and the scarf taper ratio. Then the process is repeated for each subsequent simulated scarfed ply in the laminate stack.

When a pad-up ply 274 is encountered, then the shape is morphed to minimize the offsets. More specifically, the shape of each scarfed ply boundary that comes after a drop ply is adjusted to maintain a uniform offset or uniform scarf taper ratio in all regions of the scarf. When the boundary of a pad-up ply 274 is encountered, the shape is adjusted to inset the boundary of the subsequent ply in the scarfing sequence and maintain the relative constant offset with respect to the scarf taper ratio defined by the policy. This same general shape is repeated until another pad-up ply is encountered. Then the shape is morphed again and so on until the top ply 250 is engaged and the simulated scarfing is complete.

The simulation software module 120 of scarf and bond repair application 28 (see FIG. 9) further includes a patch generator function which is user triggered. The patch generator function performs offset calculations to define boundaries for each ply that overlap the original laminate according to the prescribed taper ratio. The patch generator function is also configured to trim the repair ply contours to match the original contour lines of the scarfed section. The patch generator function is further configured to create a new geometric set with individual repair ply contours. The patch generator function also creates a new ply group with repair plies contained within the group. A geometric set contains the necessary geometry to define the boundaries of the ply; the ply group contains the metadata of the plies. Lastly, the patch generator function is further configured to create flattened ply contours projected to a planar surface for export to an automated ply cutter.

The post-simulation software module 124 of scarf and bond repair application 28 includes an automated machining code generator function which is user triggered. The machining code generator function is configured to create the contoured surface of the scarfed laminate model. The algorithm functions by first extracting the IML surface (part surface opposite the tooled surface) and then transfers all of the ply geometry to the IML surface in reversed sequence. This operation redefines the draping direction of the laminate and defines the previous IML surface as the new OML surface or tooling surface for the simulation. (Draping is how a ply lies on the surface the ply is laid upon. The draping direction is the stacking sequence of the plies. Each ply drapes and takes the shape of the surface or the ply under it.) Next, a new IML surface is generated from the scarfed ply contours and boundaries, producing a virtual 3-D surface of the scarfed laminate model that can be interpreted by machine code generators.

The machine code generator function then generates native G-code and a postprocessor is used to interpret G-code (the common name for the most widely used CNC programming language) into a selected machining language for export to a robotic or computer numerical control (CNC) milling machine. In accordance with one proposed implementation, the post-processor is a sub-element of the machine code generator that allows functionality in a variety of CNC equipment. More specifically, the post-processor is configured to interpret G-code into any one of a plurality of CNC machine languages that incorporate G-codes for execution by an operating system of different types of CNC equipment. G-codes are any word in a CNC program that begins with the letter G. G-codes are used mainly in computer-aided manufacturing to control automated machine tools. Generally, a G-code tells the machine tool what type of action to perform. G-code instructions provided to a machine controller (industrial computer) tell the motors where to move, how fast to move, and what path to follow.

After the machine has been programmed with the machine code, the machine is placed at a scarf start position relative to the composite laminate and then activated to scarf the surface of the composite laminate in the area of the discrepancy by executing the machine code. For example, an end effector of a robot may be moved according to these instructions through a toolpath, cutting away material to leave only the scarfed laminate having the desired contoured surface.

The post-simulation software module 128 of scarf and bond repair application 28 includes a topographic profile generator function which is user triggered. The topographic profile generator function is configured to explode the scarfed laminate model with the scarfed plies draped for a realistic virtual rendering. The topographic profile generator function first creates a scarfed surface or extracts the scarfed surface if it was previously generated for machining. The topographic profile generator function is further configured to generate a number of surfaces which are offset from the tooling surface (a.k.a. definition surface). The number of offset surfaces equals the number of plies to be scarfed.

In accordance with one proposed implementation, the offset distances are equal to the respective thicknesses of the scarfed plies in the scarfed laminate model. The topographic profile generator function then creates respective contours where the offset surfaces intersect the scarfed surface. The contours are curves that are created when two surfaces intersect. The topographic profile generator function is further configured to provide a user error flag for any contours that are not closed. Then the topographic profile generator function applies smoothing to each contour to remove sharp angles or points. As previously described, the topographic profile generator function also deletes any closed isolated contours that have an interior surface area less than a specified threshold (e.g., 0.0625 in² (10.24 cm²).

The topographic profile generator function is further configured to produce output drawing files in native .CATDrawing type and allow optional output of vector file types (.svg, .dxf, .bmp, .png, .pdf, and .csv) as elected by the user. Ply cutters are similar to CNC machines in that there are a variety of languages and G-codes that the ply cutters will accept. The operating systems used to generate the G-code may require different vector graphic formats, so the system disclosed herein provides a full suite of options to enable a user to select which type the output file should be.

Figure 17:
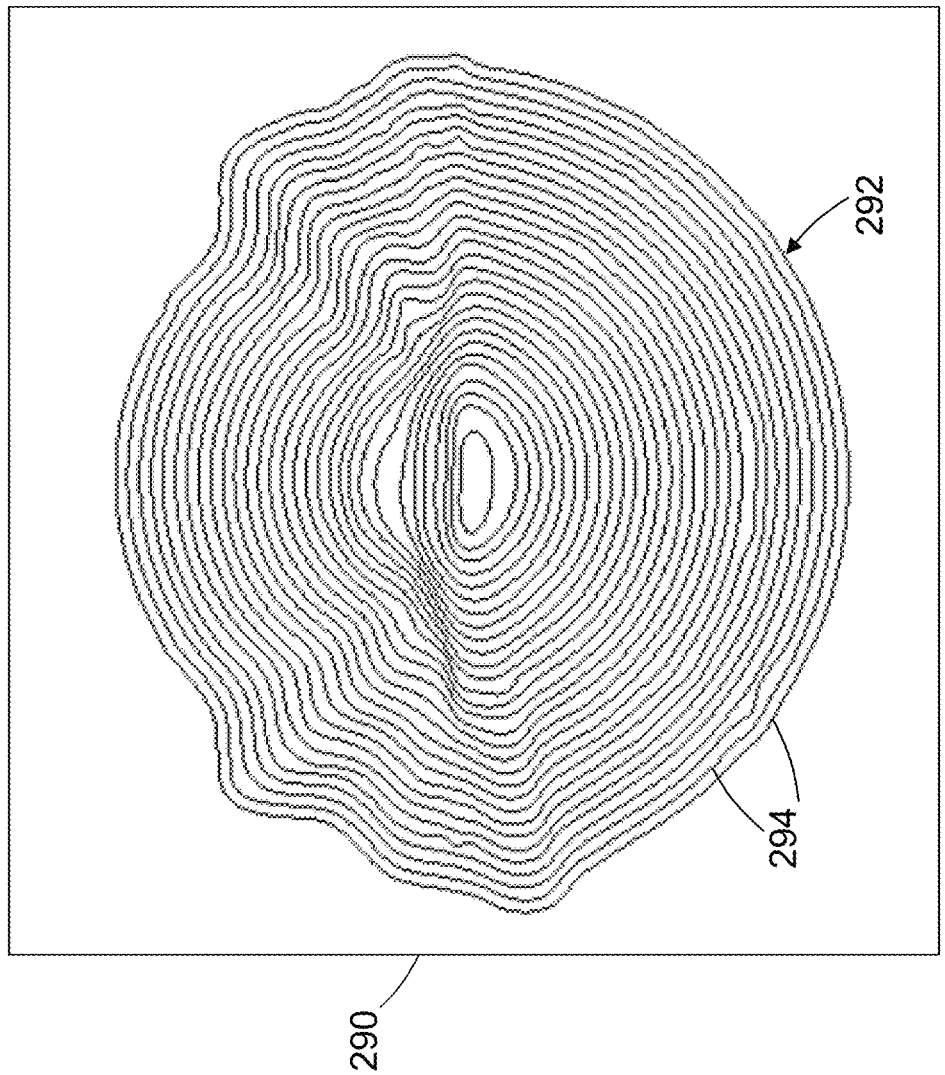
FIG. 17 is a diagram representing topographical map comprising contour lines of a scarfed laminate model based on scarf depth

FIG. 17 is a diagram representing a display window 290 showing a topographical map 292 comprising contour lines 294 of a scarf model based on scarf depth. The depth of each scarfed ply increases from the top ply to the bottom ply. The inner perimeter of each scarfed ply is indicated by a respective contour line. The topographic-type contour lines 294 shown in FIG. 17 are created from the scarfed laminate model and represent the shape of the virtual scarf. The difference in the approach adopted herein is that the topographic profile generator function does not use a flat plane to slice with. Instead the topographic profile generator function uses offsets of the tooling surface to intersect with the tapered surface that represents the depression produced by scarfing. The result is the topographic-type contour lines 294 shown in FIG. 17. These contours are created to enable semi-automated or manual use of a router to remove material and produce a stepped scarf on either flat parts or parts that are not flat. The user can define the intervals between the topographic contours. Usually, the intervals would be coincident with the ply thickness, but such coincidence is not necessary.

In addition, the post-simulation software module 122 of scarf and bond repair application 28 includes a drawing function which is user triggered. The drawing function is configured to create drawings sets with borders and signature blocks on all sheets. For example, the drawing function is configured to create a drawing sheet set that includes a 1:1 plan view of the scarfed part and a 1:2 scaled plan view of the scarfed part (each with leaders depicting ply numbers). The drawing sheet set may also include cross-sectional views in: the X axis of the scarfed part; the Y axis of the scarfed part; the X axis of the original part; and the Y axis of the original part (including leaders with ply numbers defined for the entire stackup).

In addition, the drawing function is configured to generate an empty drawing for optional user-defined views. The drawing function is also configured to provide user optional outputs, For example, the user may request that the drawing function create a repair patch drawing set or a topographical contour profile drawing. The repair patch drawing set includes a 1:1 plan view of the repair ply stackup and a scaled plan view of the repair ply stackup (each with leaders depicting ply numbers). The repair patch drawing set may also include a flattened plan view of each repair ply. In addition, the drawing function is configured to create a topographical contour profile drawing of a multi-color or multi-line type according to ply fiber orientation. The topographical contour profile drawing is a plan view of the topographic contours created by the topographic profile generator function.

In accordance with one proposed implementation, drawings are created using CATIA. Views are created in CATDrawing from CATPart. The data is formatted so that it is correctly displayed in the output drawing and includes appropriate markings and metadata. The CATDrawing may be saved as a CGM file to the user's hard drive. Optional output files include: (a) a ply table in Microsoft Excel (.xlsx) format; (b) a repair ply table in Microsoft Excel (.xlsx) format; (c) repair ply vector graphic files in various formats, such as raster images, bitmap, and vector graphics files for export of each repair ply contour (.svg, .dxf, .bmp, .png, .pdf, and .csv); and (d) topographic contour lines in a user-defined output file type for common raster images and vector graphic file types (.svg, .dxf, .bmp, .png, .pdf, and .csv). The CATDrawing files may be sent to a plotter or printer for printing. Digital files of each repair ply may be exported for use on an automated ply cutting machine. The vector file type for export (.svg, .dxf, .bmp, .png, .pdf, and .csv) is selected by the user.

Figure 18:
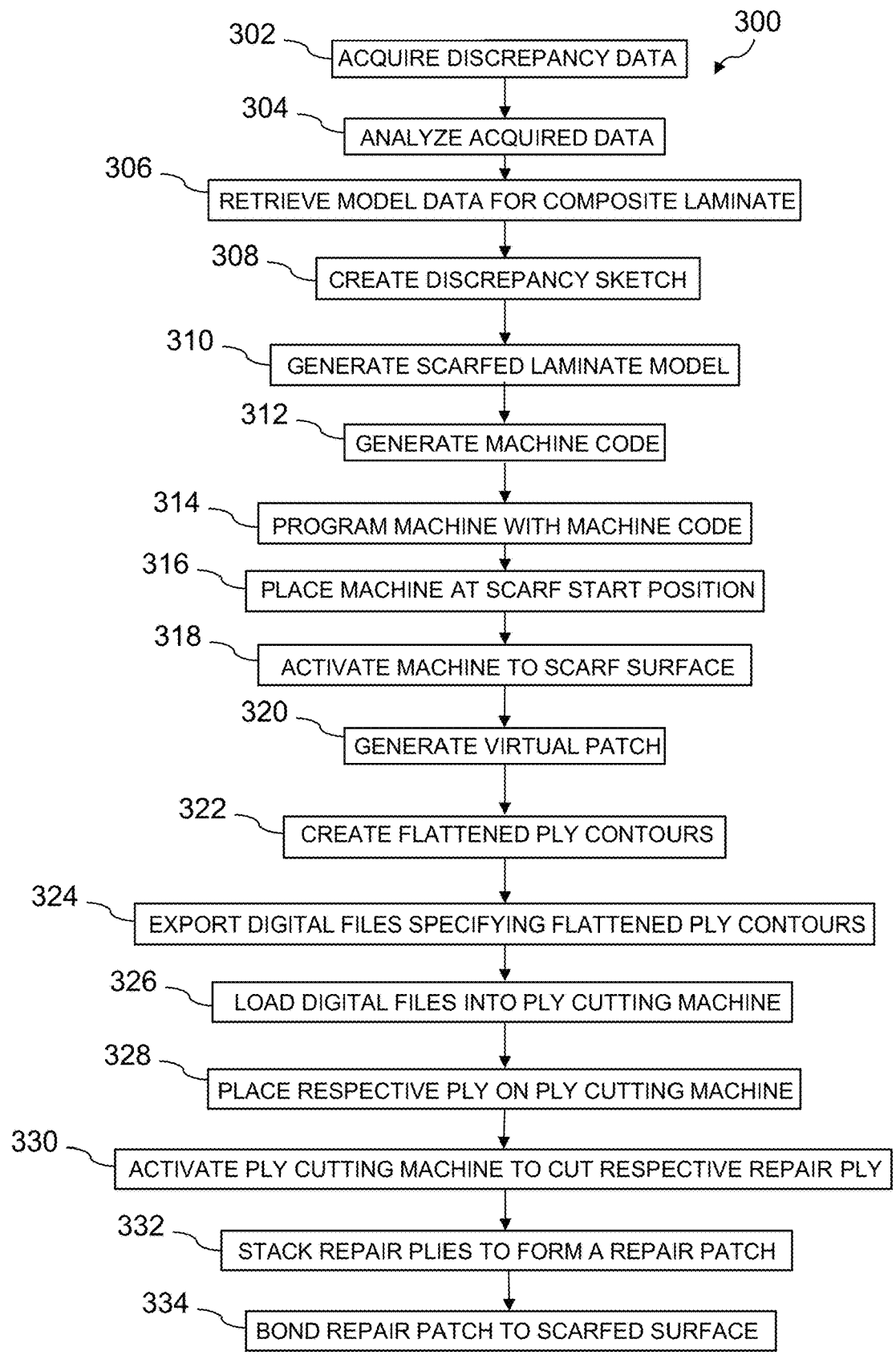
FIG. 18 is a flowchart identifying steps of a method for repairing a composite structure in accordance with one proposed implementation.

FIG. 18 is a flowchart identifying steps of a method 300 for repairing a composite structure in accordance with one proposed implementation. Although the flowchart depicts a sequence of steps, a person skilled in the art will recognize that at least some of the identified steps may be performed in a different order.

To begin the process, discrepancy data that defines a location and size of a discrepancy on a surface of a composite laminate is acquired (step 302). The acquired data is analyzed to determine an optimal scarf shape and repair methodology (step 304). In addition, model data for the composite laminate is retrieved from data storage (step 306). A discrepancy sketch of the discrepancy is created based at least in part on the discrepancy data and the model data (step 308). Then a scarfed laminate model having a virtual scarfed surface is generated in accordance with a policy defining how to create the virtual scarfed surface based on the discrepancy sketch (step 310).

Thereafter, machine code is generated for programming a machine to scarf the surface of the composite laminate in an area of the discrepancy to create a scarfed surface in conformance with the virtual scarfed surface (step 312). The machine is then programmed with the machine code (step 314). The programmed machine is then placed at a scarf start position relative to the composite laminate (step 316). The machine is activated to scarf the surface of the composite laminate in the area of the discrepancy by executing the machine code (step 318).

At any time subsequent to step 310, a virtual patch is generated that matches the virtual scarfed surface in accordance with an optimization algorithm and the policy (step 320). The virtual patch comprises virtual repair plies with ply overlaps and virtual structural plies. Based on the virtual patch, flattened ply contours are created by projecting contours of the virtual repair plies and virtual structural plies onto a planar surface to support automated ply cutting (step 322). Then digital files specifying the flattened ply contours are exported for use by a ply cutting machine (step 324).

The digital files specifying the flattened ply contours are loaded into the ply cutting machine (step 326). Then the first ply is placed on the ply cutting machine (step 328) and the ply cutting machine is activated to cut the first ply to form a first repair ply having a flattened ply contour as specified in one of the digital files specifying the flattened ply contours (step 330). Steps 328 and 330 are repeated for each virtual ply. The repair plies are then stacked to form a repair patch (step 332) and the repair patch is bonded to the scarfed surface (step 334).

Thus, the different illustrative embodiments provide a method and system for processing a discrepancy. With an illustrative embodiment, a shape of the discrepancy is identified at the location having plies of composite material. Information for a layup of the plies of composite material is identified based on the shape of the discrepancy and the location of the discrepancy. A model of the location with a portion of the number of plies in the plies of composite material removed to form a scarf based on the shape of the discrepancy in a policy for repair is created.

With the different illustrative embodiments, a model of a scarf and information about the layup of the plies of composite material in that location in which the scarf is present may be generated. This information may be created without requiring a user to search for information in various locations. Further, the creation of the scarf is based on the policy for repair. With the policy, the scarf may be an irregular shape rather than some standard shape that may be selected to encompass the discrepancy.

With these and other features in an illustrative embodiment, processing a discrepancy may take less time and expense. Time may be saved in identifying the layup of the materials and creating a scarf that is tailored to the shape of the discrepancy and a policy for performing repair on the discrepancy.

While systems and methods for actualizing simulated scarfing and patching for repair of composite laminates have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The flowcharts and block diagrams in the different depicted embodiments illustrate the architecture, functionality, and operation of some possible implementations of systems and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for preparing to repair a composite structure, the method comprising:
    (a) acquiring discrepancy data that defines a location and size of a discrepancy on a surface of a composite laminate;
    (b) analyzing the acquired discrepancy data to determine an optimal scarf shape and repair methodology;
    (c) retrieving model data for the composite laminate from data storage;
    (d) creating a discrepancy sketch of the discrepancy based at least in part on the discrepancy data and the model data;
    (e) generating a scarfed laminate model having a virtual scarfed surface in accordance with a policy defining how to create the virtual scarfed surface based on the discrepancy sketch; and
    (f) generating machine code for programming a machine to scarf the surface of the composite laminate in an area of the discrepancy to create a scarfed surface in conformance with the virtual scarfed surface,
    wherein step (e) comprises adjusting scarf taper ratios in any direction to reduce an amount of material removed when pad-up plies are present.

2. The method as recited in claim 1, further comprising:
    programming the machine with the machine code;
    placing the machine at a scarf relative to the composite laminate; and
    activating the machine to scarf the surface of the composite laminate in the area of the discrepancy by executing the machine code.

3. A method for preparing to repair a composite structure, the method comprising:
    (a) acquiring discrepancy data that defines a location and size of a discrepancy on a surface of a composite laminate;
    (b) analyzing the acquired discrepancy data to determine an optimal scarf shape and repair methodology;
    (c) retrieving model data for the composite laminate from data storage;
    (d) creating a discrepancy sketch of the discrepancy based at least in part on the discrepancy data and the model data;
    (e) generating a scarfed laminate model having a virtual scarfed surface in accordance with a policy defining how to create the virtual scarfed surface based on the discrepancy sketch;
    (f) generating machine code for programming a machine to scarf the surface of the composite laminate in an area of the discrepancy to create a scarfed surface in conformance with the virtual scarfed surface;

(g) generating a topographic profile based on the scarfed laminate model, wherein the topographic profile comprises a plurality of topographic contours;
(h) providing a user error flag for any topographic contours that are not closed; and
(i) exporting a digital file specifying the plurality of topographic contours of the topographic profile.

4. The method as recited in claim 3, further comprising:
programming the machine with the machine code;
placing the machine at a scarf start position relative to the composite laminate; and
activating the machine to scarf the surface of the composite laminate in the area of the discrepancy by executing the machine code.

5. The method as recited in claim 4, wherein step (f) comprises interpreting the virtual scarfed surface of the scarfed laminate model into G-code using a machine code generator.

6. The method as recited in claim 5, wherein the machine is a computer numerical control milling machine, and step (f) further comprises generating a computer numerical control program that includes the G-code.

7. The method as recited in claim 4, further comprising:
generating a virtual patch that matches the virtual scarfed surface in accordance with an optimization algorithm and the policy, the virtual patch comprising virtual repair plies with ply overlaps and virtual structural plies;
creating flattened ply contours of the virtual repair plies and virtual structural plies on a planar surface to support automated ply cutting; and
exporting digital files specifying the flattened ply contours for use by a ply cutting machine.

8. The method as recited in claim 7, further comprising:
(j) loading the digital files specifying the flattened ply contours into the ply cutting machine;
(k) placing a ply on the ply cutting machine; and
(l) activating the ply cutting machine to cut the ply to form a repair ply having a flattened ply contour as specified in one of the digital files specifying the flattened ply contours,
wherein steps (k) and (l) are repeated for each virtual ply to form respective repair plies having flattened ply contours as specified in the digital files.

9. The method as recited in claim 8, further comprising:
stacking the repair plies to form a repair patch; and
bonding the repair patch to the scarfed surface.

10. The method as recited in claim 3, wherein step (f) comprises:
generating a plurality of virtual surfaces which are spaced at intervals from a definition surface; and
intersecting the virtual surfaces with the virtual scarfed surface.

11. The method as recited in claim 3, further comprising:
loading the digital file specifying the plurality of topographic contours into a smart router;
placing the smart router on the surface of the composite laminate; and
activating the smart router to form a stepped scarf in the composite laminate having contours in conformance with respective specified topographic contours.

12. A method for preparing to repair a composite structure, the method comprising:
(a) acquiring discrepancy data that defines a location and size of a discrepancy on a surface of a composite laminate;
(b) analyzing the acquired discrepancy data to determine an optimal scarf shape and repair methodology;
(c) retrieving model data for the composite laminate from data storage;
(d) creating a discrepancy sketch of the discrepancy based at least in part on the discrepancy data and the model data;
(e) generating a scarfed laminate model having a virtual scarfed surface in accordance with a policy defining how to create the virtual scarfed surface based on the discrepancy sketch;
(f) generating machine code for programming a machine to scarf the surface of the composite laminate in an area of the discrepancy to create a scarfed surface in conformance with the virtual scarfed surface;
(g) generating a topographic profile based on the scarfed laminate model, wherein the topographic profile comprises a plurality of topographic contours;
(h) deleting any closed isolated topographic contours that have an interior surface area less than a specified threshold; and
(i) exporting a digital file specifying the plurality of topographic contours of the topographic profile.

13. The method as recited in claim 12, further comprising:
programming the machine with the machine code;
placing the machine at a scarf start position relative to the composite laminate; and
activating the machine to scarf the surface of the composite laminate in the area of the discrepancy by executing the machine code.

14. The method as recited in claim 13, wherein step (f) comprises interpreting the virtual scarfed surface of the scarfed laminate model into G-code using a machine code generator.

15. The method as recited in claim 14, wherein the machine is a computer numerical control milling machine, and step (f) further comprises generating a computer numerical control program that includes the G-code.

16. The method as recited in claim 13, further comprising:
generating a virtual patch that matches the virtual scarfed surface in accordance with an optimization algorithm and the policy, the virtual patch comprising virtual repair plies with ply overlaps and virtual structural plies;
creating flattened ply contours of the virtual repair plies and virtual structural plies on a planar surface to support automated ply cutting; and
exporting digital files specifying the flattened ply contours for use by a ply cutting machine.

17. The method as recited in claim 16, further comprising:
(j) loading the digital files specifying the flattened ply contours into the ply cutting machine;
(k) placing a ply on the ply cutting machine; and
(l) activating the ply cutting machine to cut the ply to form a repair ply having a flattened ply contour as specified in one of the digital files specifying the flattened ply contours,
wherein steps (k) and (l) are repeated for each virtual ply to form respective repair plies having flattened ply contours as specified in the digital files.

18. The method as recited in claim 17, further comprising:
stacking the repair plies to form a repair patch; and
bonding the repair patch to the scarfed surface.

19. The method as recited in claim 12, wherein step (f) comprises:
generating a plurality of virtual surfaces which are spaced at intervals from a definition surface; and intersecting the virtual surfaces with the virtual scarfed surface.

20. The method as recited in claim 12, further comprising:
loading the digital file specifying the plurality of topographic contours into a smart router;
placing the smart router on the surface of the composite laminate; and
activating the smart router to form a stepped scarf in the composite laminate having contours in conformance with respective specified topographic contours.

* * * * *